US010346254B2

(12) United States Patent
Wu et al.

(10) Patent No.: US 10,346,254 B2
(45) Date of Patent: *Jul. 9, 2019

(54) COMMIT REQUEST PROCESSING FOR DATASET IMAGE CREATION SUCCESS

(71) Applicant: NetApp Inc., Sunnyvale, CA (US)

(72) Inventors: Stephen Wu, Sacramento, CA (US); Prathamesh Deshpande, San Jose, CA (US); Manan Patel, Sunnyvale, CA (US)

(73) Assignee: NetApp Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,114

(22) Filed: Oct. 2, 2017

(65) Prior Publication Data

US 2018/0024891 A1    Jan. 25, 2018

Related U.S. Application Data

(63) Continuation of application No. 14/875,127, filed on Oct. 5, 2015, now Pat. No. 9,778,995, which is a
(Continued)

(51) Int. Cl.
*G06F 12/00* (2006.01)
*G06F 11/14* (2006.01)
(Continued)

(52) U.S. Cl.
CPC ........ *G06F 11/1451* (2013.01); *G06F 3/0604* (2013.01); *G06F 3/065* (2013.01);
(Continued)

(58) Field of Classification Search
CPC .... G06F 11/1451; G06F 3/0604; G06F 3/067; G06F 11/1438; G06F 11/1464;
(Continued)

(56) References Cited

U.S. PATENT DOCUMENTS 6,671,704 B1 * 12/2003 Gondi ................. G06F 11/2028
707/648
6,823,349 B1 * 11/2004 Taylor ................. G06F 11/2082
(Continued)

OTHER PUBLICATIONS

ExParte Quayle Action cited in U.S. Appl. No. 13/903,745 dated Jan. 7, 2015, 12 pgs.
(Continued)

*Primary Examiner* — Hong C Kim
(74) *Attorney, Agent, or Firm* — Cooper Legal Group, LLC

(57) ABSTRACT

An application may store data to a dataset comprising a plurality of volumes stored on a plurality of storage systems. The application may request a dataset image of the dataset, the dataset image comprising a volume image of each volume of the dataset. A dataset image manager operates with a plurality of volume image managers in parallel to produce the dataset image, each volume image manager executing on a storage system. The plurality of volume image managers respond by performing requested operations and sending responses to the dataset image manager in parallel. Each volume image manager on a storage system may manage and produce a volume image for each volume of the dataset stored to the storage system. If a volume image for any volume of the dataset fails, or a timeout period expires, a cleanup procedure is performed to delete any successful volume images.

20 Claims, 15 Drawing Sheets

Related U.S. Application Data continuation of application No. 13/903,745, filed on May 28, 2013, now Pat. No. 9,152,340.

(51) Int. Cl.
  *G06F 3/06* (2006.01)
  *G06F 11/07* (2006.01)
(52) U.S. Cl.
  CPC ............ *G06F 3/067* (2013.01); *G06F 3/0619* (2013.01); *G06F 3/0652* (2013.01); *G06F 11/07* (2013.01); *G06F 11/0727* (2013.01); *G06F 11/0757* (2013.01); *G06F 11/1438* (2013.01); *G06F 11/1446* (2013.01); *G06F 11/1464* (2013.01); *G06F 11/1469* (2013.01); *G06F 2201/84* (2013.01)
(58) Field of Classification Search
  CPC .... G06F 3/065; G06F 11/1469; G06F 3/0619; G06F 3/0652; G06F 11/07; G06F 11/0757; G06F 11/0727; G06F 11/1446; G06F 2201/84
  USPC ..... 707/662, 692, 684; 714/48, 19; 711/161, 711/162, 112
  See application file for complete search history.

(56) References Cited

U.S. PATENT DOCUMENTS

| | | | |
|---|---|---|---|
| 7,260,589 B2 | 8/2007 | Cotner et al. | |
| 7,281,024 B1 | 10/2007 | Banerjie et al. | |
| 7,783,787 B1* | 8/2010 | DeBergalis | G06F 3/0611 710/1 |
| 9,152,327 B2 | 10/2015 | Wu et al. | |
| 9,152,340 B2 | 10/2015 | Wu et al. | |
| 9,778,995 B2* | 10/2017 | Wu | G06F 11/1451 |
| 2004/0250029 A1* | 12/2004 | Ji | G06F 11/2066 711/162 |
| 2005/0228832 A1 | 10/2005 | Ghotge et al. | |
| 2006/0026452 A1* | 2/2006 | Suzuki | G06F 11/2097 714/2 |
| 2006/0080503 A1 | 4/2006 | Araki et al. | |
| 2008/0178185 A1 | 7/2008 | Akada et al. | |
| 2008/0215670 A1 | 9/2008 | Redd et al. | |
| 2008/0270488 A1* | 10/2008 | Ozawa | G06F 11/2041 |
| 2009/0031096 A1* | 1/2009 | Smith | G06F 11/2092 711/162 |
| 2009/0178015 A1 | 7/2009 | Federovsky et al. | |
| 2011/0041006 A1* | 2/2011 | Fowler | G06F 9/466 714/10 |
| 2011/0078657 A1 | 3/2011 | Yoshihiro | |
| 2012/0173822 A1 | 7/2012 | Testardi et al. | |
| 2013/0268503 A1 | 10/2013 | Budithi et al. | |
| 2014/0173213 A1 | 6/2014 | Beveridge et al. | |
| 2014/0250233 A1* | 9/2014 | Webster | H04L 67/1097 709/227 |
| 2014/0359236 A1 | 12/2014 | Wu et al. | |
| 2015/0193264 A1* | 7/2015 | Hutton | G06F 9/466 719/328 |

OTHER PUBLICATIONS

Reply ExParte Quayle Action cited in U.S. Appl. No. 13/903,745 dated May 7, 2015, 12 pgs.

Notice of Allowance cited in U.S. Appl. No. 13/903,745 dated Jun. 1, 2015, 15 pgs.

Amendment after Notice of Allowance cited in U.S. Appl. No. 13/903,745 dated Aug. 28, 2015, 10 pgs.

Non-Final Office Action cited in U.S. Appl. No. 14/875,127 dated Feb. 10, 2017, 27 pgs.

Reply Non-Final Office Action cited in U.S. Appl. No. 14/875,127 dated May 10, 2017, 13 pgs.

Notice of Allowance cited in U.S. Appl. No. 14/875,127 dated May 30, 2017, 24 pgs.

Amendment after Notice of Allowance cited in U.S. Appl. No. 14/875,127 dated Aug. 29, 2017, 8 pgs.

* cited by examiner

| Volume ID | Storage System ID | Volume Information |
|---|---|---|
| VID1 | SSID1 | VI1 |
| VID2 | SSID2 | VI2 |
| VID3 | SSID3 | VI3 |
| ⋮ | | |

FIG. 7

| 805 { | Operation ID 810 | | Start Time 815 | Timeout Period 820 |
|---|---|---|---|---|
| | SSID 850 | VID(s) 855 | Volume-Start Response 860 | Volume-Commit Response 865 |
| 801a { | SSID1 | VID1 | Y | Success |
| 801b { | SSID2 | VID3, VID4 | Y | Success |
| 801c { | SSID3 | VID11, VID13 | Y | Fail |

COMMIT REQUEST PROCESSING FOR DATASET IMAGE CREATION SUCCESS

RELATED APPLICATION

This application claims priority to and is a continuation of U.S. Publication Ser. No. 14/875,127, filed on Oct. 5, 2015, titled "DATASET IMAGE CREATION AND FAILURE CLEANUP", which claims priority to and is a continuation of U.S. Pat. No. 9,152,340, filed on May 28, 2013, titled "SYSTEM AND METHOD FOR MANAGING AND PRODUCING A DATASET IMAGE ACROSS MULTIPLE STORAGE SYSTEMS", which are incorporated herein by reference.

FIELD OF THE INVENTION

Embodiments of the present invention relate to storage systems, and in particular, to a system and method for managing and producing a dataset image across multiple storage systems.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD). The storage operating system of the storage system may implement a high-level module, such as a file system, to logically organize the information stored on volumes as a hierarchical structure of storage objects, such as files and logical units (LUs). A known type of file system is a write-anywhere file system that does not overwrite data on disks.

The storage system may be further configured to allow many servers to access storage objects stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected as a cluster to provide a storage system architecture configured to service many servers. In some embodiments, the storage system architecture provides one or more aggregates, each aggregate comprising a set of one or more storage devices (e.g., disks). Each aggregate may store one or more storage objects, such as one or more volumes. An aggregate may be distributed across a plurality of storage systems. The storage objects (e.g., volumes) may be configured to store content of storage objects, such as files and logical units, served by the cluster in response to multi-protocol data access requests issued by servers.

Each storage system of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each storage system is embodied as a disk element (D-blade) and the multi-protocol engine is embodied as a network element (N-blade). The N-blade receives a multi-protocol data access request from a server, converts that access request into a cluster fabric (CF) message and redirects the message to an appropriate D-blade of the cluster.

The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system.

Each server typically executes numerous applications requiring the data services of the cluster. For example, data for a particular application may be stored as a dataset on a particular storage system of the cluster. The dataset may comprise a plurality of storage objects (e.g., volumes) stored on the storage system. The particular application may access its dataset on the storage system to add, modify, or delete data of the dataset. In addition, the storage system may provide a backup data service that produces a backup image of an application's dataset. The backup image of a dataset may be used for example, to restore the dataset in case of data corruption of the dataset.

In current cluster storage systems, however, it is becoming more common for a dataset of an application to comprise a plurality of storage objects that are stored across a plurality of different storage systems. In this situation, it has become more difficult to produce a successful overall image of a dataset stored across many storage systems. In particular, conventionally it is difficult to coordinate and ensure that all storage systems have successfully produced their images and have not retained stale backup images from failed backup attempts. As such, an effective method for managing and producing an image for a dataset stored across multiple storage systems is needed.

BRIEF DESCRIPTION OF THE DRAWINGS

FIG. 7 shows a conceptual diagram of an exemplary configuration data structure in accordance with some embodiments.

FIG. 8 shows a conceptual diagram of an exemplary dataset-operation data structure in accordance with some embodiments.

DETAILED DESCRIPTION

Figure 1:
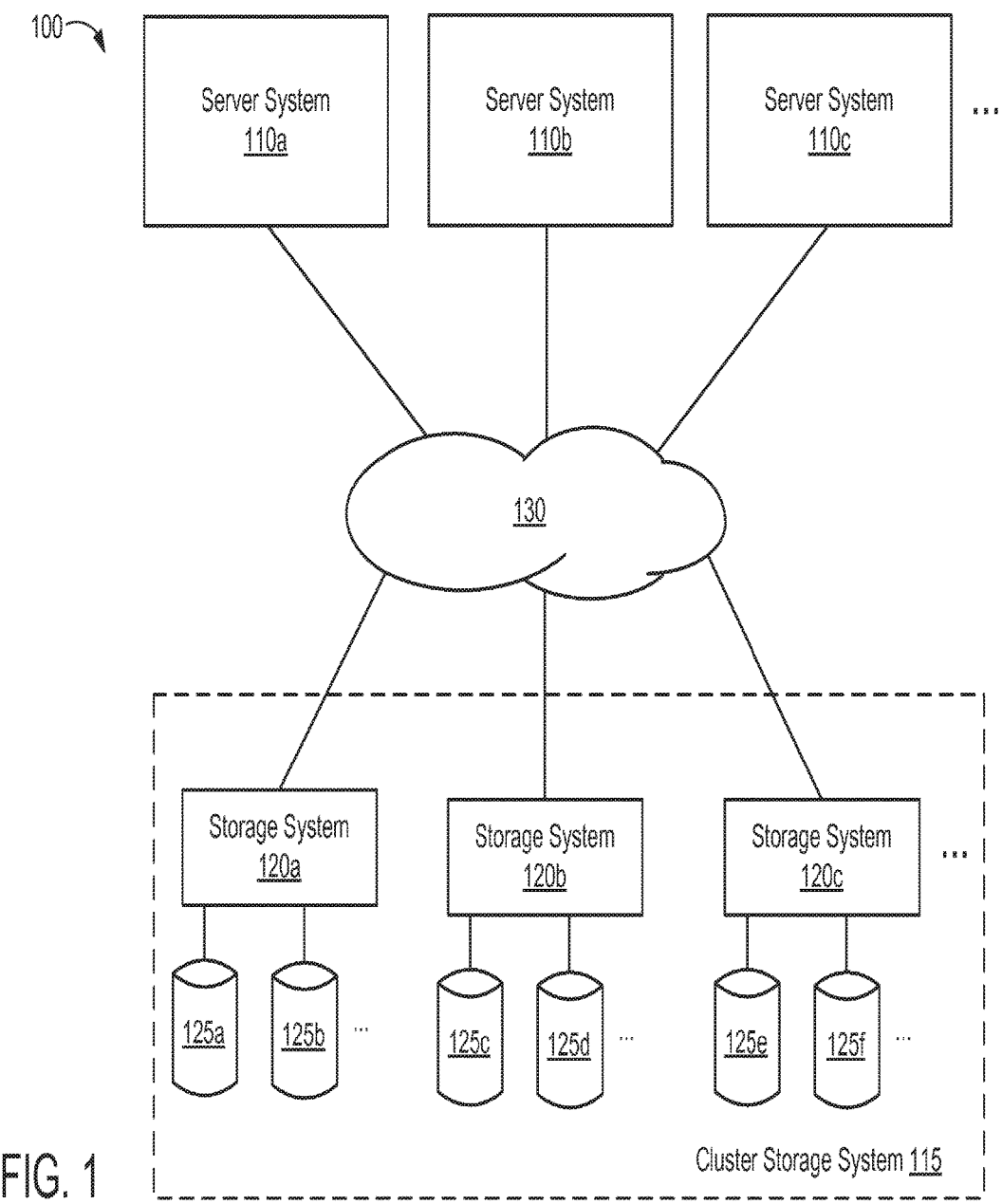
FIG. 1 is a schematic block diagram of an exemplary cluster storage system environment in which some embodiments operate.

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into four sections. Section I contains terms used herein. Section II describes a cluster storage system environment in which some embodiments operate. Section III describes a dataset image manager for managing and producing a dataset image for a dataset that is stored across multiple storage systems. Section IV describes a volume image manager for managing and producing at least one volume image for at least one volume that is stored on a storage system.

I. Terms

Cluster of storage systems: As used herein, a cluster comprises a plurality of storage systems. Each storage system in the cluster may be associated with a unique identifier (storage system ID) that uniquely identifies the storage system within the cluster. For example, the storage system ID may comprise an IP address of the storage system.

Identified storage system: As used herein, an identified storage system may refer to a storage system that stores one or more volumes of a dataset.

Storage object: As used herein, a storage object comprises any logically definable storage element stored or contained within a cluster storage system. The cluster storage system may store a plurality of storage objects for storing data of a plurality of applications. A storage object may comprise any data container for storing data, such as an aggregate, volume, virtual volume (e.g., flexible volume), file, logical units (LUs), etc. In other embodiments, storage objects comprise any other logically definable storage element stored or contained within the cluster storage system. For illustrative purposes, a storage object comprising a volume is used in the embodiments described herein. In other embodiments, another type of storage object other than a volume may be used in the embodiments described herein. Each storage object may be associated with a unique storage object identifier (storage object ID) that uniquely identifies the storage object within the cluster. For example, each volume may be associated with a unique volume ID that uniquely identifies the volume within the cluster.

Identified storage object: As used herein, an identified storage object may refer to a storage object that is included in a dataset. For example, an identified volume may refer to a volume that is included in a dataset.

Dataset: As used herein, a dataset may comprise data for a particular application. In some embodiments, a dataset comprises a plurality of storage objects stored on a plurality of storage systems. The application may access its dataset on the storage systems to add, modify, or delete data of the dataset. For example, an email application, executing on a server, may store its data to an email exchange dataset that is stored across a plurality of storage systems.

Image: As used herein, an image may comprise a persistent point in time (PPT) view or image of data of a storage object. An image may provide a read-only copy of a storage object that protects against accidental deletions or modifications of data of the storage object. As such, an image may comprise a persistent image of the exact state of the data of the storage object at a given point in time. For example, an image may comprise a snapshot image produced using Snapshot™ technology provided by NetApp, Inc. of Sunnyvale, Calif. In other embodiments, an image may be produced using other technologies. An image may comprise a data backup of the storage object that may be used, for example, to restore/recover the data of the storage object after data has been corrupted, lost, or altered. As used herein, a "storage object image" comprises an image of a storage object. As used herein, a "dataset image" comprises an image of a dataset that comprises a plurality of storage objects, the dataset image comprising a plurality of storage object images of the plurality of storage objects of the dataset. For example, a dataset image may comprise a plurality of volume images of a plurality of volumes of the dataset, each volume image comprising an image of one volume of the dataset.

Dataset image manager: As used herein, a dataset image manager may comprise an application or engine configured for managing and producing a dataset image for a dataset comprising a plurality of storage objects stored on a plurality of storage systems. The dataset image manager may manage and produce the dataset image in response to a request from an application for a dataset image of its dataset. The dataset image manager may work in conjunction with a plurality of storage object image managers (executing on a plurality of storage systems) to produce the dataset image. The dataset image manager may reside and execute on any computer system, such as a server system, storage system, or a dedicated computer system/box.

Storage object image manager: As used herein, a storage object image manager may comprise an application or engine configured for managing and producing at least one storage object image for at least one storage object stored on a storage system. The storage object image manager may manage and produce the at least one storage object image in response to a request from the dataset image manager for the at least one storage object image. The storage object image manager may reside and execute on the storage system. In the exemplary embodiments described, the storage object image manager may be referred to as a volume image manager for managing and producing at least one volume image for at least one volume stored on a storage system.

Communication messages: Communication messages may be sent between the various components described herein, such as between an application, a dataset image manager, and/or a volume image manager. Communication messages may be sent between such components, for example, through a network or data bus. As used herein, the following communication messages may be used:

Dataset-start request is sent from an application to a dataset image manager for beginning producing a dataset image of a dataset.

Volume-start request is sent from the dataset image manager to a volume image manager of each identified storage system to begin producing one or more volume images of one or more identified volumes of the dataset stored to the storage system.

Volume-start response is sent from each volume image manager to the dataset image manager to indicate that the one or more identified volumes have been suspended and producing one or more volume images of the one or more identified volumes has been initiated.

Dataset-start response (resume response) is sent from the dataset image manager to the application to indicate that all volumes of the dataset have been suspended and producing volume images of all volumes of the dataset has been initiated.

Dataset-commit request is sent from an application to the dataset image manager for completing producing the dataset image of the dataset.

Volume-commit request is sent from the dataset image manager to a volume image manager of each identified storage system to complete producing one or more volume images of one or more identified volumes of the dataset stored to the storage system. In particular, the volume-commit request may comprise a request for each identified storage system to determine and indicate the success or failure of producing volume images of identified volumes of the dataset that are stored to the storage system.

Volume-commit response is sent from a volume image manager of a storage system to the dataset image manager to indicate the success or failure of producing volume images of identified volumes of the dataset that are stored to the storage system.

Dataset-commit response is sent from the dataset image manager to the application to indicate whether the dataset image of the dataset has succeeded or failed.

Volume-cleanup request is sent from the dataset image manager to a volume image manager of each identified storage system to delete one or more volume images of one or more volumes stored to the storage system.

II. Cluster Storage System Environment

FIG. 1 is a schematic block diagram of an exemplary cluster storage system environment 100 in which some embodiments operate. The environment 100 comprises one or more server systems 110 (such as 110a, 110b, 110c, etc.) and a plurality of storage systems 120 (such as 120a, 120b, 120c, etc.) connected via a connection system 130. The plurality of storage systems 120 comprises a cluster storage system 115. Each storage system 120 comprises a set of one or more storage devices 125 (such as 125a, 125b, 125c, etc.). The connection system 130 may comprise a network, such as a Local Area Network (LAN), Wide Area Network (WAN), metropolitan area network (MAN), the Internet, or any other type of network or communication system between computer systems.

Each storage system 120 may have a distributed architecture. For example, each storage system 120 may include separate N module (network module) and D module (data module) components (not shown). In such an embodiment, the N module is used to communicate with the server systems 110, while the D module includes the file system functionality and is used to communicate with the storage devices 125. In another embodiment, the storage system may have an integrated architecture, where the network and data components are all contained in a single box or unit. The storage system 120 may be coupled through a switching fabric (not shown) to other storage systems 120 in the cluster 115. In this way, all the storage systems 120 of the cluster 115 may be interconnect to form a single storage pool that may be accessed by the connected server systems 110.

The storage systems 120 comprise functional components that cooperate to provide a distributed storage system architecture providing consolidated data services to the server systems 110. A server system 110 may comprise a computer system that utilizes services of the cluster storage system 115 to store and manage data in the storage devices 125 of the storage systems 120. Interaction between a server system 110 and a storage system 120 can enable the provision of storage services. That is, server system 110 may request the services of the storage system 120, and the storage system 120 may return the results of the services requested by the server system 110, by exchanging packets over the connection system 130. The server system 110 may request the services of the storage system by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The storage system 120 may comprise a computer system that stores data in a set of storage devices 125, preferably on one or more writable storage device media (such as magnetic disks, video tape, optical, DVD, magnetic tape, and any other similar media adapted to store information, including data and parity information). The storage system 120 may implement a file system to logically organize the data as storage objects on the storage devices 125. A server system 110 may execute one or more applications that submit access requests for accessing particular storage objects on the storage devices 125.

Figure 2:
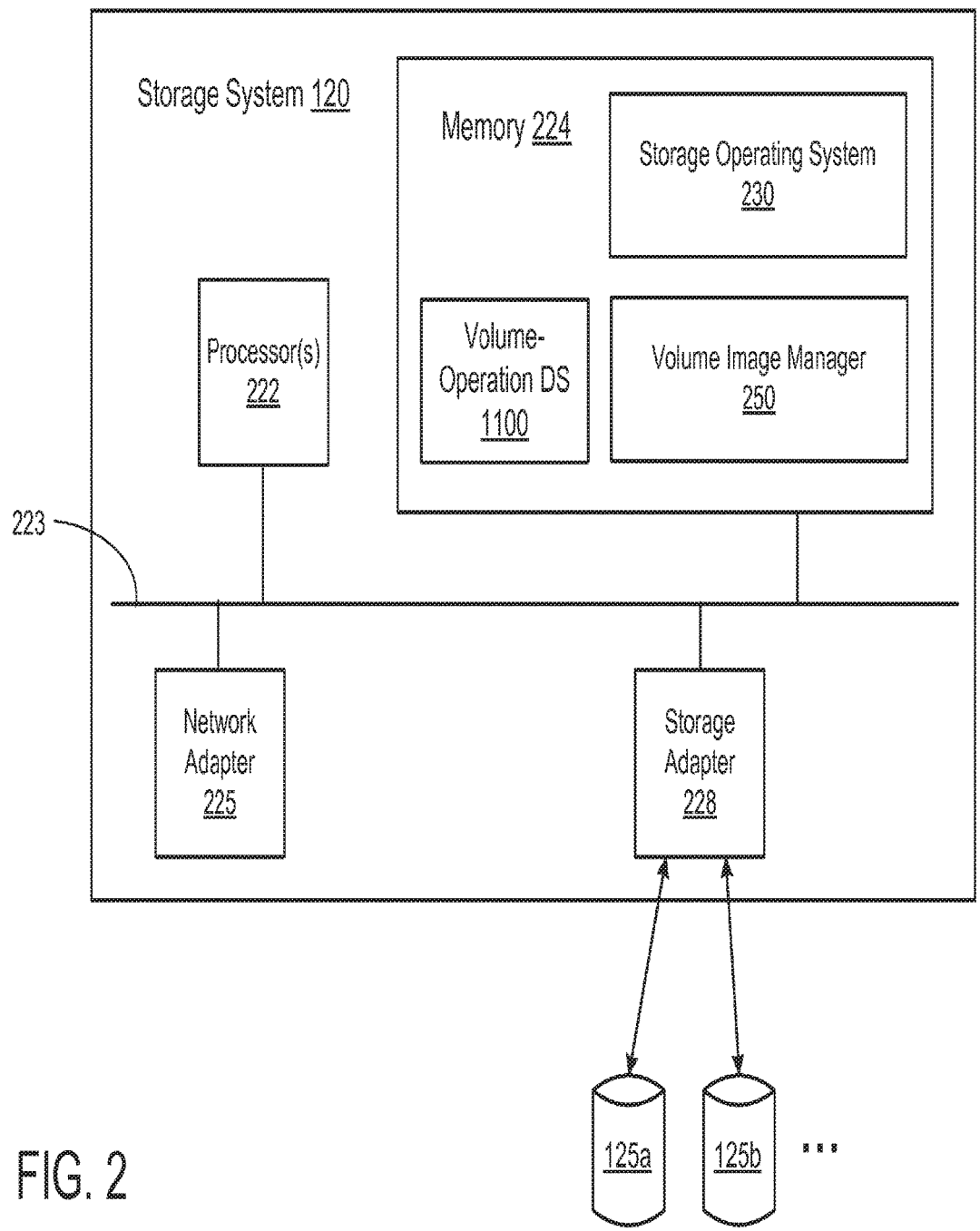
FIG. 2 is a diagram illustrating various components of the storage system, in accordance with some embodiments.

FIG. 2 is a diagram illustrating various components of a storage system 120, in accordance with some embodiments. Specifically, the storage system comprises one or more processors 222, a memory 224, a network adapter 225, and a storage adapter 228 interconnected by a system bus 223. The storage system 120 executes a storage operating system 230 that implements a storage file system. The memory 224 comprises storage locations that are addressable by the processors 222 and adapters 225 and 228 for storing software program code (such as the storage operating system 230 and volume image manager 250) and data structures. The processor and adapters may, in turn, comprise processing elements and/or logic circuitry configured to execute the software code and manipulate various data.

The network adapter 225 comprises a plurality of ports adapted to couple the storage system 120 to one or more server systems 110 over point-to-point links, wide area networks, virtual private networks implemented over a public network (Internet) or a shared local area network. A server system 110 may establish a connection with a storage system 120 through the network adapter 225 to access the storage devices 125 of the storage system (through use of the storage adapter 228). In some embodiments, an application executing on the server system 110 may establish a connection with a storage system 120 to access the storage devices 125.

The storage adapter 228 is coupled with the storage devices 125 of the storage system and cooperates with the storage operating system 230 to access particular data on the storage devices 125 (e.g., as requested by an application executing on the server system 110). The storage adapter 228 comprises a plurality of ports having input/output (I/O) interface circuitry that couples to the storage devices 125 over an I/O interconnect arrangement. The storage operating system 230, portions of which are typically resident in memory 224 and executed by the processing elements, functionally organizes the storage system 120 by, inter alia, invoking storage operations in support of the storage service implemented by the storage system 120. It will be apparent to those skilled in the art that other processing and memory means, including various computer readable media, may be used for storing and executing program instructions pertaining to the invention described herein.

The storage system 120 executes a storage operating system 230 that implements a storage file system. In this sense, the Data ONTAP® storage operating system, available from NetApp, Inc. of Sunnyvale, Calif., that implements a Write Anywhere File Layout (WAFL®) file system, is an example of such a storage operating system implemented as a microkernel within an overall protocol stack and associated storage. The storage operating system 230 can also be implemented as an application program operating over a general-purpose operating system, such as UNIX□ or Windows□, or as a general-purpose operating system with configurable functionality, which is configured for storage applications as described herein.

The memory 224 may store software program code such as the storage operating system 230 that is executable by the processor(s) 222. The storage operating system 230 may implement the storage file system to logically organize data on the storage devices 125 as one or more storage objects and provide a logical/virtual representation of how the storage objects are organized on the storage devices 125. As such, a cluster of one or more storage systems 120 may also organize and store one or more storage objects. As used herein, a storage object comprises any logically definable storage element stored or contained within the cluster storage system 115. Each storage object may be associated with a unique storage object identifier (storage object ID) that uniquely identifies the storage object within the cluster 115. For example, each volume may be associated with a unique volume ID that uniquely identifies the volume within the cluster. The storage operating system 230 of a storage system 120 also manages access to the storage objects stored on the storage devices 125. In some embodiments, an application may establish a connection with the storage operating system 230 to access storage devices 125 of the storage system 120. The application may implement various connections having various protocols to establish a connection with the storage system 120, such as an iSCSI or a Transport Control Protocol (TCP) connection.

In some embodiments, each storage system 120 in the cluster may execute a volume image manager 250. In these embodiments, the memory 224 may also store software program code such as the volume image manager 250 that is executable by the processor(s) 222. In this manner, the volume image manager 250 may comprise a volume image manager engine 250 comprising computer software and/or hardware components configured for performing embodiments described herein. The volume image manager 250 may be configured for managing and producing at least one volume image for at least one volume stored on the storage system. The volume image manager 250 may perform embodiments described herein in response to request(s) from a dataset image manager 350. In some embodiments, the memory 224 may also store data structures (such as a volume-operation data structure 1100) that are used by the volume image manager 250 for performing embodiments described herein.

Figure 3:
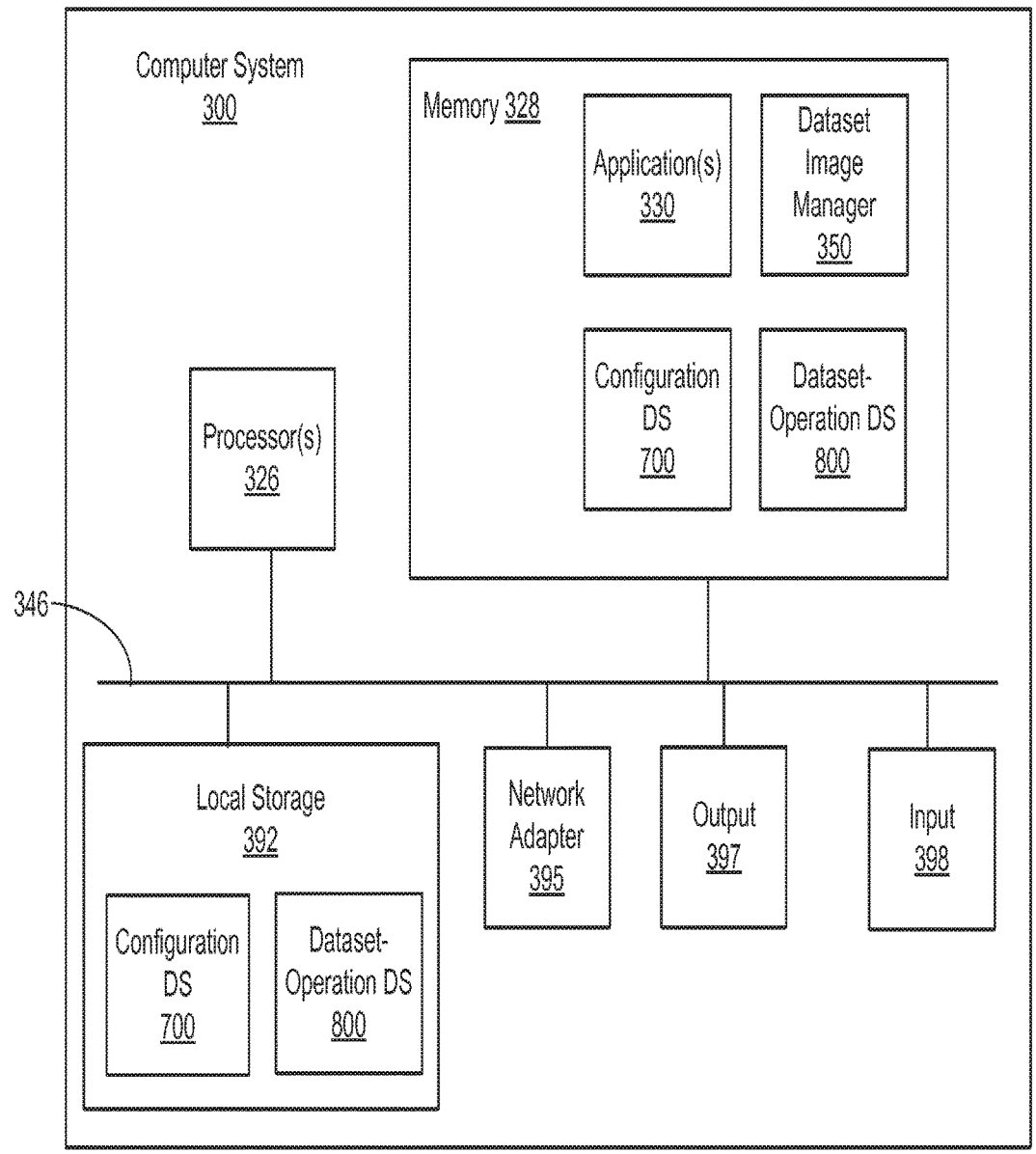
FIG. 3 is a schematic block diagram of an exemplary computer system, in accordance with some embodiments.

FIG. 3 is a schematic block diagram of an exemplary computer system 300, in accordance with some embodiments. The computer system 300 may execute a dataset image manager 350. In some embodiments, the computer system 300 may comprise a server system 110, a storage system 120, or a dedicated computer system/box for executing the dataset image manager 350. In these embodiments, the dataset image manager 350 may reside and execute on any computer system, such as a server system 110, a storage system 120, or a dedicated computer system/box. In some embodiments, the dataset image manager 350 resides on each storage system 120. In these embodiments, when an application interacts with a particular storage system 120 to initiate producing a dataset image, the dataset image manager 350 residing on that particular storage system 120 may initiate and manage operations for producing the dataset, as described herein.

The computer system 300 comprises processor(s) 326, memory 328, a local storage 392, a network adapter 395, output component(s) 397, and input component(s) 398 coupled by a bus 346. The processors 326 are the central processing units (CPUs) of the computer system 300 and, thus, control the overall operation of the computer system 300. Processors 326 may include one or more programmable general-purpose or special-purpose microprocessors, digital signal processors (DSPs), programmable controllers, application specific integrated circuits (ASICs), programmable logic devices (PLDs), or the like, or a combination of such devices. The network adapter 395 comprises a plurality of ports adapted to couple the computer system 300 to one or more other computer systems (such as servers or storage systems 120) over point-to-point links, wide area networks, virtual private networks implemented over a public network (Internet) or a shared local area network. The network adapter 395 thus may comprise the mechanical, electrical and signaling circuitry needed to connect the storage system to the network.

The output component(s) 397 may be of any type generally used by a computer system to provide information to an end user (e.g., administrator). For example, the output component 397 could include a monitor, an audio speaker, or an alphanumeric display. Similarly, the input component(s) 398 may be of any type that allows an end user to provide input into a computer system. For example, the input component 398 may be a keyboard, a mouse, or a speech recognition system.

Memory 328 can be a random access memory (RAM), a read-only memory (ROM), or the like, or a combination of such devices. It will be apparent to those skilled in the art that other processing and memory means, including various computer readable media, may be used for storing and executing program instructions pertaining to the embodiments described herein. Memory 328 comprises storage locations that are addressable by the processor 326 and adapters for storing software program code, such as software described herein. The processor 326 and adapters may, in turn, comprise processing elements and/or logic circuitry configured to execute the software code. Such software code may include an operation system (not shown) and one or more applications 330.

In some embodiments, an application 330 stores its data to a dataset. The dataset may comprise a plurality of storage objects stored on a plurality of different storage systems 120. The application may access its dataset on the storage systems to add, modify, or delete data of the dataset. For example, an email application 330, executing on the computer system 300, may store its data to an email exchange dataset that is stored across a plurality of different storage systems 120. The computer system 300 may also execute a dataset image manager 350.

In these embodiments, the memory 328 may also store software program code such as the dataset image manager 350 that is executable by the processor(s) 326. In this manner, the dataset image manager 350 may comprise a dataset image manager engine 350 comprising computer software and/or hardware components configured for performing embodiments described herein. The dataset image manager 350 may be configured for managing and producing a dataset image for a dataset. The dataset image manager 350 may manage and produce the dataset image in response to a request from an application 330 for a dataset image of its dataset. The dataset image manager 350 may work in conjunction with a plurality of volume image managers 250 (executing on a plurality of storage systems 120) to produce the dataset image. In some embodiments, the memory 328 may also store data structures such as a configuration data structure (DS) 700 and an dataset-operation data structure (DS) 800 that are used by the dataset image manager 350 for performing embodiments described herein. In other embodiments, the dataset image manager 350 may reside and execute on a storage system 120.

Local storage 392 is a storage device that stores data structures such the configuration DS 700 and the dataset-operation DS 800 that are used by the dataset image manager 350 for performing embodiments described herein. The computer system 300 may load data stored on the local storage 392 into memory 328 from which they are accessed by processors 326.

III. Dataset Image Manager for Managing and Producing a Dataset Image

A. Overview of Dataset Image Manager and Volume Image Manager

As described herein, an application may store its data to a dataset comprising a plurality of volumes stored on a plurality of storage systems. The application may require a backup image (dataset image) of the dataset. A resulting produced dataset image may comprise a plurality of volume images stored on a plurality of storage systems. In some embodiments, the dataset image manager 350 operates in conjunction with a plurality of volume image managers 250, each volume image manager 250 residing and executing on a storage system among the plurality of storage systems.

In particular, the dataset image manager 350 may manage and coordinate operations for the plurality of volume image managers 250 by sending requests to the plurality of volume image managers 250 for producing the dataset image. In some embodiments, the dataset image manager 350 may perform interactions and operations between the plurality of volume image managers 250 in parallel. The plurality of volume image managers 250 may also respond by performing requested operations and sending responses to the dataset image manager 350 in parallel. Each volume image manager 250 executing on a storage system may manage at least one volume image for at least one identified volume of the dataset that is stored to the storage system. The dataset image manager 350 may store and maintain a dataset-operation DS 800 to perform embodiments herein. The volume image manager 250 may store and maintain a volume-operation DS 1100 to perform embodiments herein.

The dataset image manager 350 may execute a dataset image method 500 (described in relation to FIGS. 5A-C) for managing and producing the dataset image. In some embodiments, the dataset image method 500 may be viewed as comprising two phases for producing a dataset image of a dataset: a start phase and a commit phase. The start phase generally relates to suspending all volumes of the dataset and initiate/begin producing a dataset image of its dataset. The commit phase generally relates to managing and completing the volume images of the volumes of the dataset to produce the dataset image. Typically, the start phase requires a substantially shorter time to complete relative to the commit phase. Dividing the dataset image method 500 may provide performance and scalability advantages. For example, in the start phase, the dataset image manager 350 may receive a dataset-start request from an application for beginning producing a dataset image of a dataset of the application and the dataset image manager 350 will coordinate with the plurality of volume image managers 250 to quickly suspend/fence all volumes of the dataset (i.e., suspend all input/output (I/O) operations of all volumes of the dataset). After all volumes of the dataset are suspended, the dataset image manager 350 may send a resume response/signal to the application. Typically, each application will be configured such that it will not resume its other operations (operations not related to I/O operations to the volumes of its dataset) until it receives the resume response. As such, by dividing the dataset image method 500 into a start phase and a commit phase, the application does not need to wait for the substantially longer commit phase to complete before receiving the resume response and resuming its other operations. This may be especially important for database and other applications that are sensitive to performance latency.

Each volume image manager 250 may execute a volume image method 900 (described in relation to FIGS. 9A-B) for managing and producing one or more volume images. The dataset image method 500 may manage and coordinate operations and requests for the volume image method 900, and volume image method 900 may respond by performing the requests. As such, the volume image method 900 may also be viewed as comprising a start phase and a commit phase for managing and producing one or more volume images.

In some embodiments, producing a dataset image for a dataset is considered successful only if a volume image is successfully produced for each and all volumes of the dataset across the plurality of storage systems within a predetermined timeout period. In these embodiments, if even one volume image manager 250 on a storage system does not successfully produce a volume image for even one volume of the dataset, producing the dataset image is considered a failure.

Also, if all volume images of all volumes of the dataset are not successfully produced within the timeout period, producing the dataset image is also considered a failure. In some embodiments, either the dataset image manager 350 and/or any of the volume image managers 250 may enforce the timeout period and cause a failure of the dataset image. In these embodiments, the dataset image manager 350 may initiate a dataset image timeout method 600 (described in relation to FIG. 6) that is executed for monitoring and implementing the timeout period. Also, each volume image manager 250 may separately and individually monitor and implement the timeout period by initiating a volume image timeout method 1000 (described in relation to FIG. 10).

As such, the producing the dataset image may fail if producing one or more volume images fails, or the timeout period expires before the entire dataset image is produced. When producing the dataset image fails (either by a failed volume image or expiration of the timeout period), a cleanup procedure is performed to delete one or more volume images produced and stored on one or more storage systems. In some embodiments, the cleanup procedure may be used for deleting one or more volume images that were successfully produced on one or more storage systems. Since the volume images were produced for an unsuccessful data image, the volume images are no longer needed and unnecessarily consumes storage resources. As such, the cleanup procedure provides automated removal of unneeded volume images that were produced for an unsuccessful data image. The dataset image manager 350 may initiate a cleanup procedure across the plurality of storage systems, wherein in response, each volume image manager 350 on each storage system executes a cleanup method 1200 (as described in relation to FIG. 12). In addition, each volume image manager 350 of each storage system may also separately and individually initiate a cleanup procedure on the storage system.

As such, the embodiments described herein provide a system and method for providing an ability to create crash consistent multi-volume image. The system and method may do so by suspending I/O operations to the volumes during the duration of image creation for the volumes.

B. Dataset Image

Figure 4:
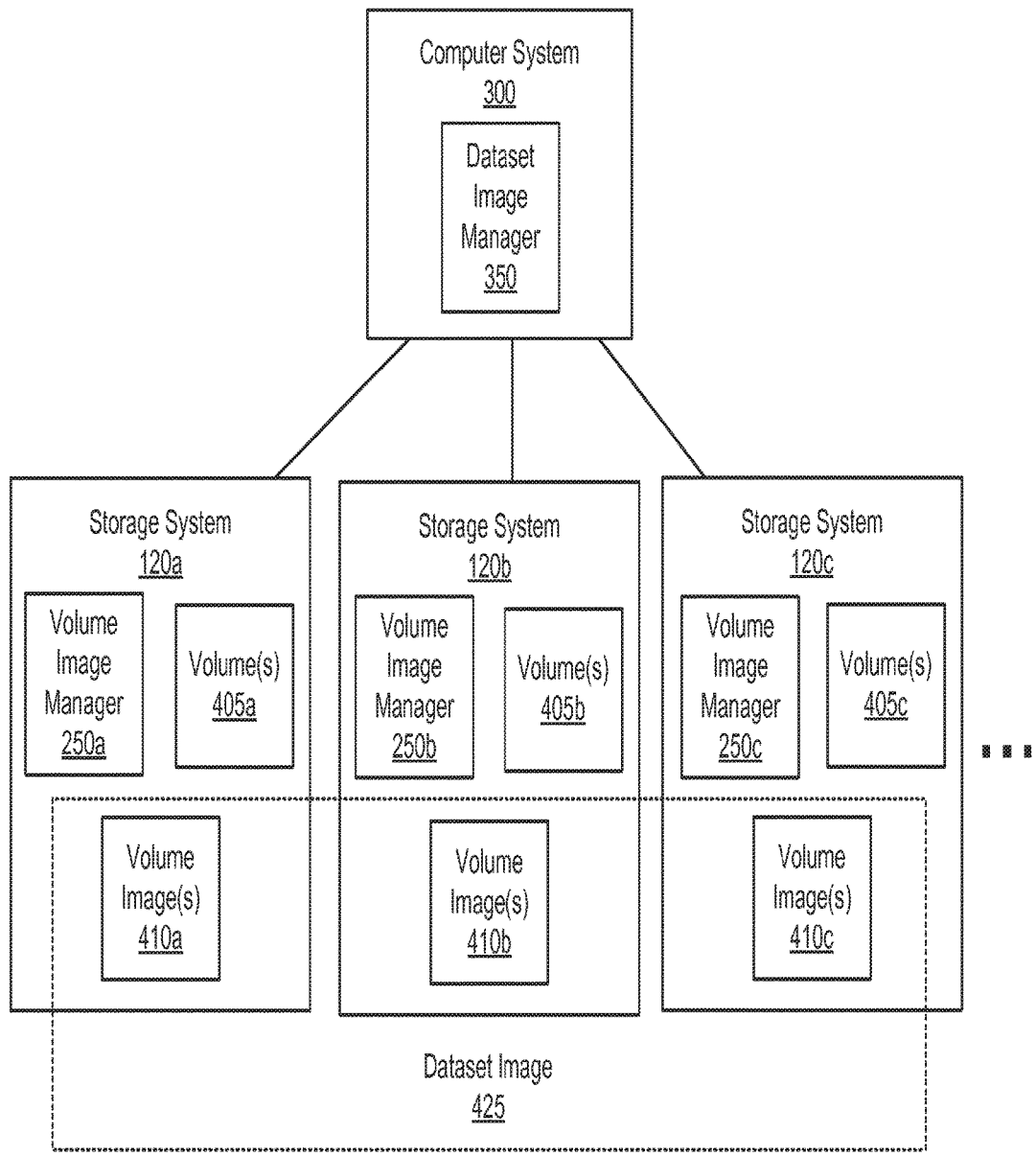
FIG. 4 shows a conceptual diagram of a dataset image of a dataset of an application, the dataset comprising a plurality of volumes stored on a plurality of different storage systems.

FIG. 4 shows a conceptual diagram of a dataset image of a dataset of an application, the dataset comprising a plurality of volumes stored on a plurality of different storage systems 120. In some embodiments, the dataset comprises at least one volume from each of at least two different storage systems 120. For example, as shown in FIG. 4, the dataset may comprise at least one volume 405a stored on a first storage system 120a, at least one volume 405b stored on a second storage system 120b, at least one volume 405c stored on a third storage system 120c, etc.

As shown in FIG. 4, the dataset image manager 350 may manage and coordinate with a plurality of volume image managers 250 (e.g., 250a, 250b, 250c) executing on the plurality of storage system 120 (e.g., 120a, 120b, 120c) for performing embodiments herein for producing a dataset image 425. In some embodiments, each volume image manager 250 executing on a storage system 120 may manage and produce at least one volume image 410 for the at least one identified volume 405 of the dataset that is stored to the storage system 120. As used herein, for a particular storage system 120, an identified volume may refer to a volume of a dataset that is stored to the particular storage system 120. For example, as shown in FIG. 4, a first volume image manager 250a may produce at least one volume image 410a for at least one volume 405a of the dataset that is stored on a first storage system 120a, a second volume image manager 250b may produce at least one volume image 410b for at least one volume 405b of the dataset that is stored on a second storage system 120b, a third volume image manager 250c may produce at least one volume image 410c for at least one volume 405c of the dataset that is stored on a third storage system 120c, etc.

A dataset image 425 may comprise a plurality of volume images 410 of a plurality of volumes 405 that are stored on a plurality of different storage systems 120. In some embodiments, the dataset image 425 comprises at least one volume image 410 for at least one volume 405 from each of at least two different storage systems 120. For example, as shown in FIG. 4, the dataset image 425 may comprise at least one volume image 410a for at least one volume 405a stored on a first storage system 120a, at least one volume image 410b for at least one volume 405b stored on a second storage system 120b, at least one volume image 410c for at least one volume 405c stored on a third storage system 120c, etc.

C. Method for Managing and Producing a Dataset Image

Figure 5A:
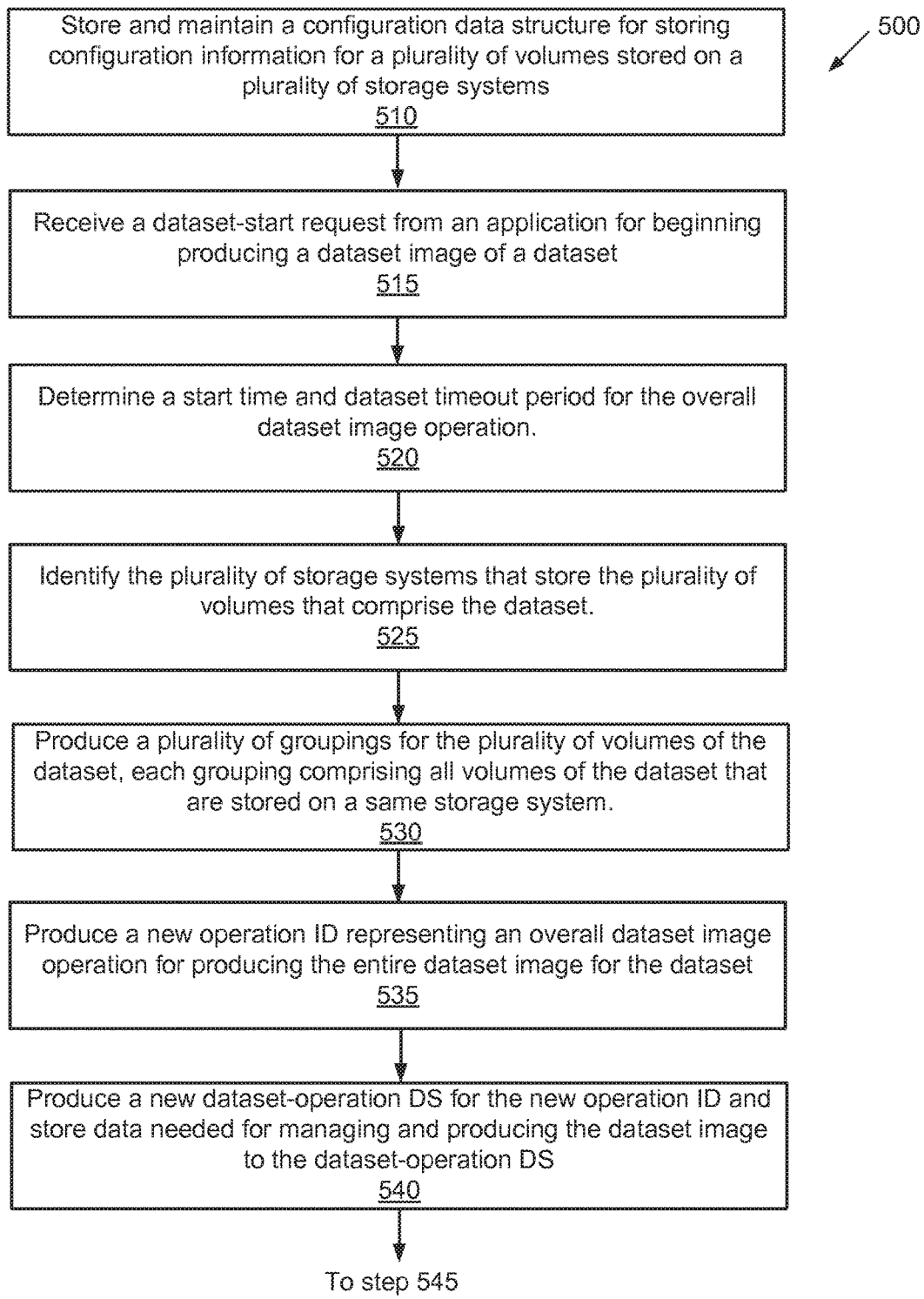
FIGS. 5A-C are a flowchart of dataset image method for managing and producing a dataset image of a dataset.
Figure 5B:
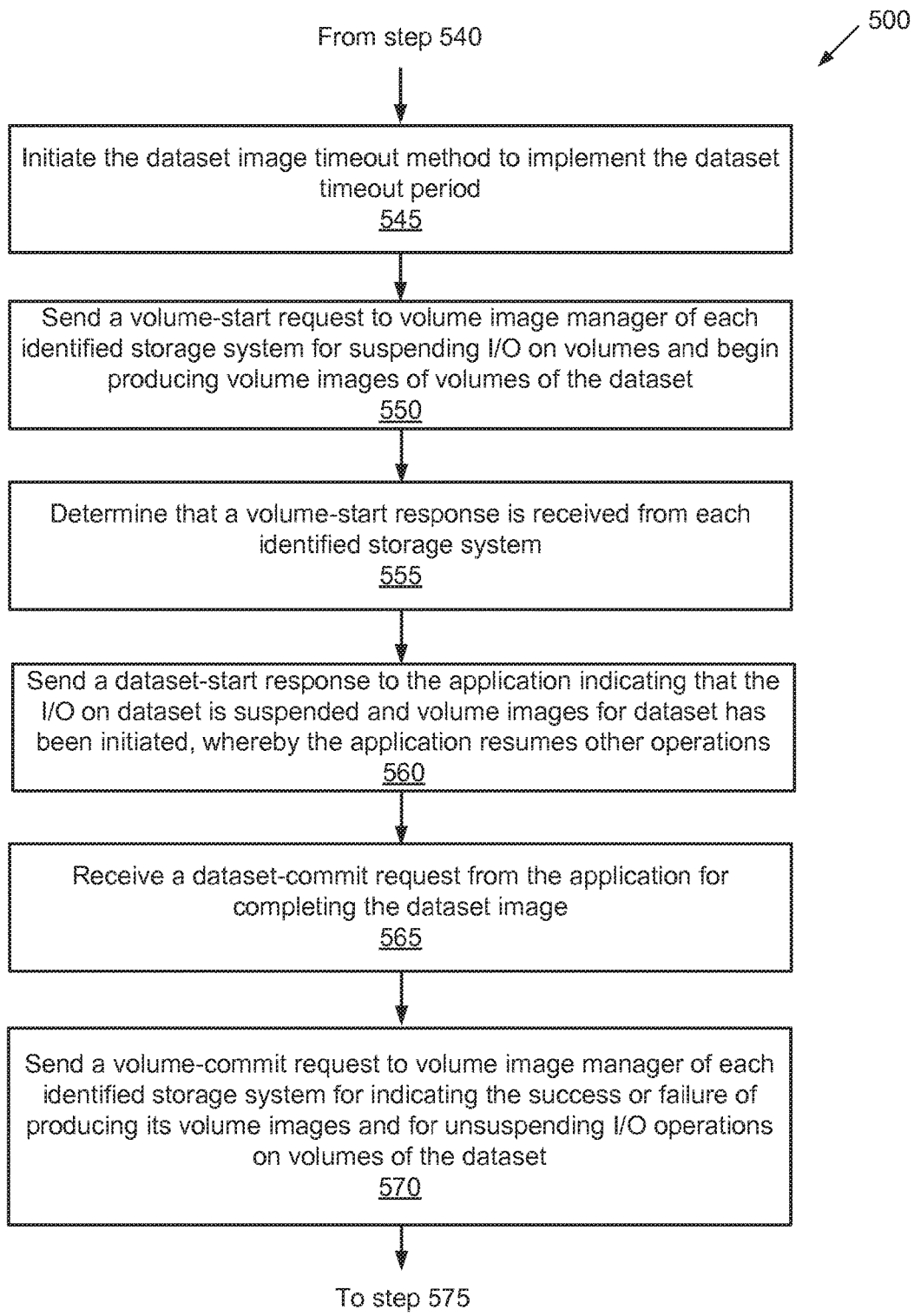
Figure 5C:
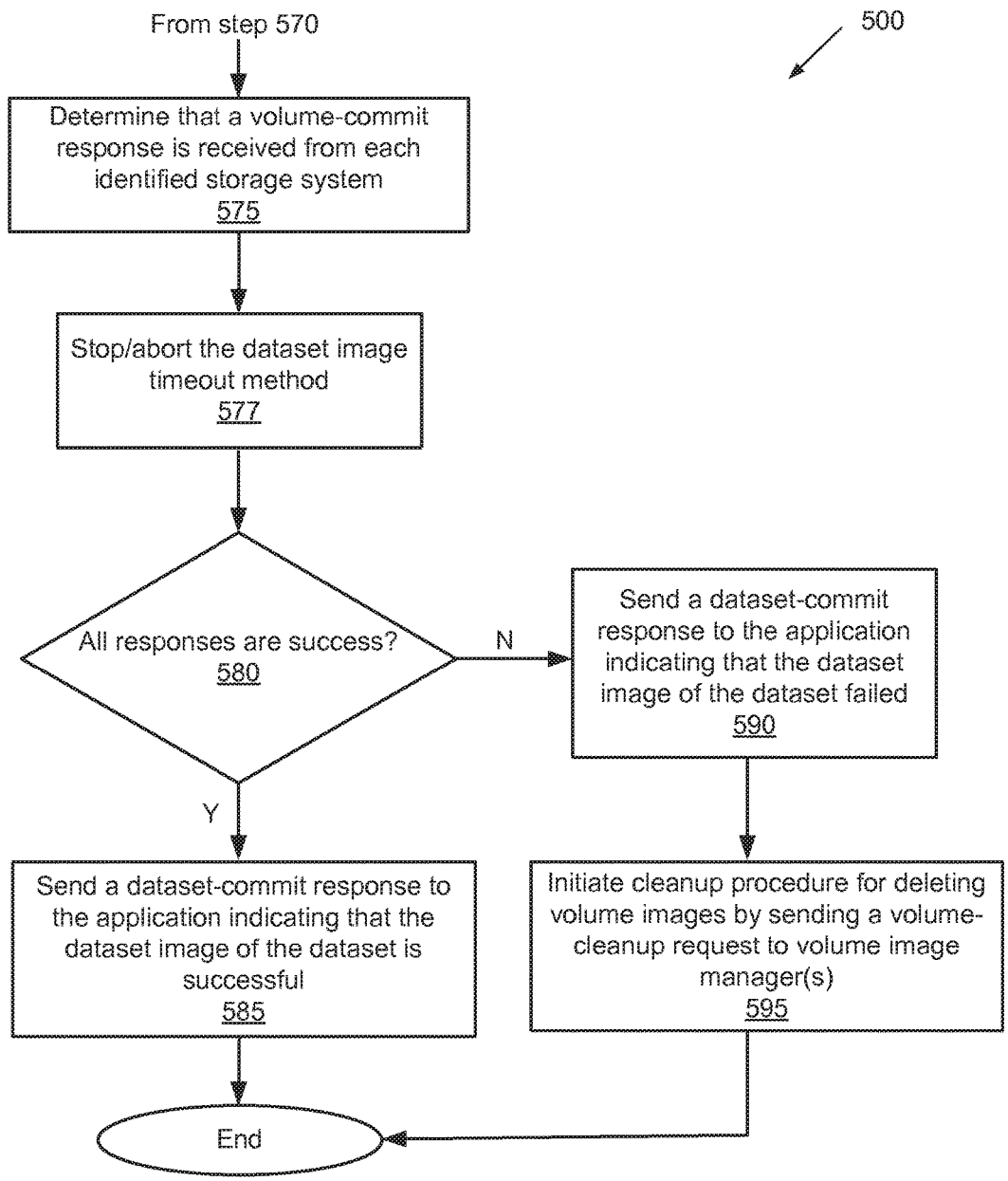

FIGS. 5A-C are a flowchart of dataset image method 500 for managing and producing a dataset image of a dataset. In some embodiments, the dataset comprises a plurality of storage objects (e.g., volumes) stored on a plurality of different storage systems 120. Steps of method 500 may be performed by various hardware and/or software components residing and executing on a computer system 300 and/or storage system 120 that are configured for performing the method 500. In some embodiments, some or all steps of the method 500 are performed by a dataset image manager 350 residing and executing on a computer system 300 (such as a server system 110 or storage system 120). The method 500 may use various communication messages sent between the various components described herein, such as between an application, a dataset image manager, and/or a volume image manager. Communication messages may be sent between such components, for example, through a network, data bus, or the like. The order and number of steps of the method 500 are for illustrative purposes only and, in other embodiments, a different order and/or number of steps are used.

In general, the dataset image method 500 may determine the plurality of volumes that comprise a dataset, as well as determine the plurality of storage systems 120 that store the plurality of volumes. The dataset image method 500 may then manage and produce a dataset image of the dataset by coordinating with a plurality of volume image managers 250 executing on the plurality of storage systems 120. In some embodiments, the dataset image method 500 may perform interactions and operations between the plurality of volume image managers 250 in parallel. The plurality of volume image managers 250 may also respond by performing requested operations and sending responses to the dataset image manager 350 in parallel. In these embodiments, the plurality of volume image managers 250 may perform operations described herein simultaneously for managing and producing the volume images in parallel to allow for faster execution of the dataset image method 500 and production of the dataset image across the plurality of storage systems 120. In addition, the dataset image method 500 may initiate a dataset image timeout method 600 (described in relation to FIG. 6) that is simultaneously executed for monitoring and implementing a dataset timeout period that may cause an abort/stoppage of the dataset image method 500.

Figure 7:
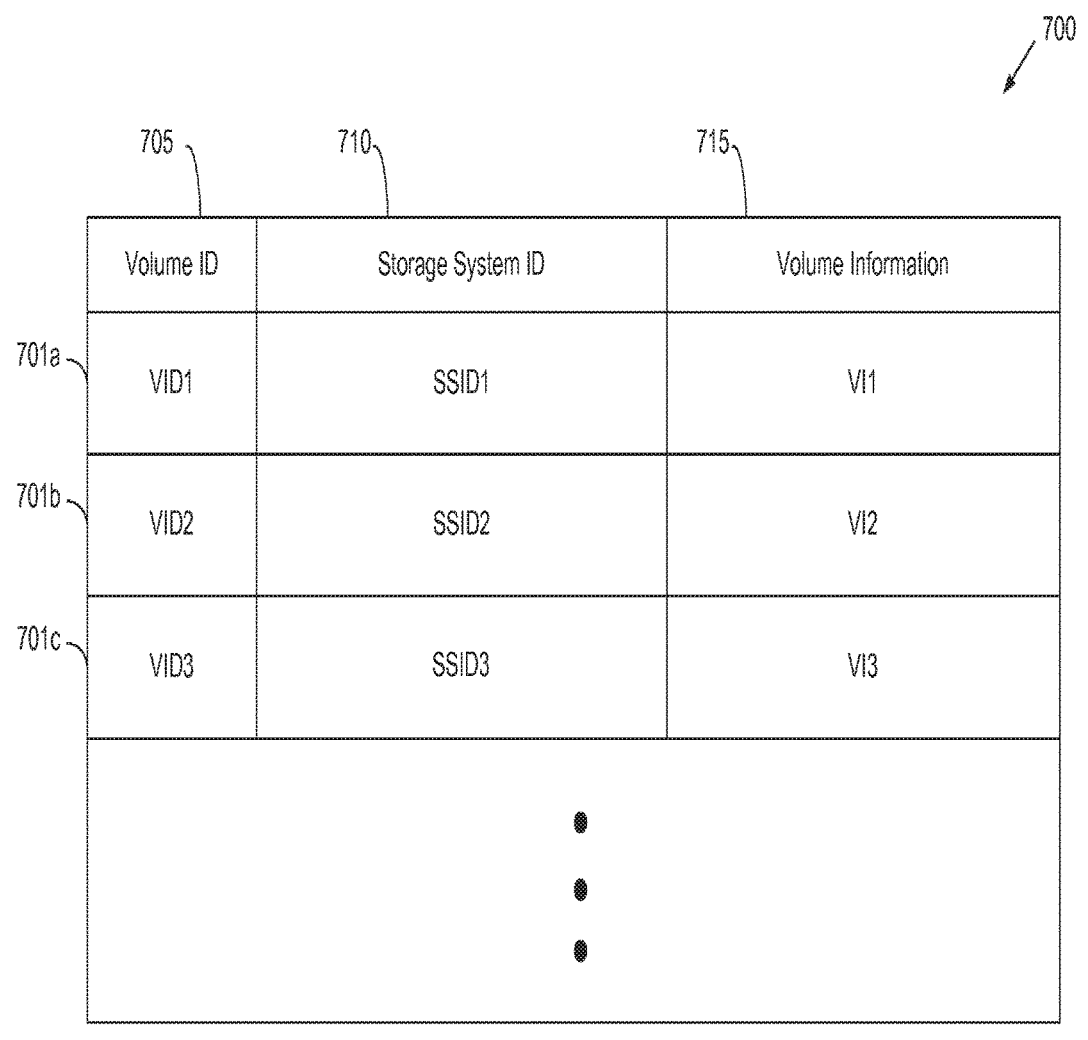

The method 500 begins by storing and maintaining (at 510) a configuration data structure for storing configuration information for a plurality of volumes stored on a plurality of storage systems 120 of a cluster storage system 115. FIG. 7 shows a conceptual diagram of an exemplary configuration data structure 700 in accordance with some embodiments. The configuration data structure 700 may comprise a plurality of volume entries 701 (such as 701a, 701b, etc.), each volume entry 701 representing a volume stored in the cluster storage system 115. Each volume entry 701 for a volume may comprise a plurality of data fields, such as data fields for a volume ID 705 (e.g., VID1, VID2, etc.), storage system ID 710 (e.g., SSID1, SSID2, etc.), and volume information 715 (e.g., VI1, VI2, etc.).

As discussed above, each volume may be associated with a unique volume ID 705 that uniquely identifies the volume within the cluster. Also, each storage system 120 in the cluster may be associated with a unique storage system ID 710 that uniquely identifies the storage system 120 within the cluster. For example, the storage system ID may comprise an IP address of the storage system. As such, for a particular volume that is represented by a particular volume entry 701, the data field for the volume ID 705 may specify a volume ID associated with the particular volume and the data field for the storage system ID 710 may specify a storage system ID of the storage system that stores the particular volume. Also, the data field for the volume information 715 may specify various information regarding the particular volume. For example, the volume information 715 may include a data size of the volume, dates and times when the volume was created, accessed, or modified, dates and times when any data images were produced for the volume, etc. In other embodiments, the volume information 715 may include other information regarding the volume. In some embodiments, the configuration data structure 700 may be used by the method 500 as a look-up or mapping table to determine which storage system 120 stores a particular volume.

The method 500 then receives (at 515) a dataset-start request, from an application (such as an application 330 executing on a computer system 300) for beginning producing a dataset image of a dataset. For example, the dataset-start request may comprise a dataset-start application programming interface (API) call from the application. In some embodiments, the dataset-start request further specifies a plurality of volumes that comprise the dataset. For example, the dataset-start request may specify a plurality of volume IDs of the plurality of volumes that comprise the dataset. In these embodiments, the plurality of volumes that comprise the dataset are stored across a plurality of different storage systems 120. For example, the application may comprise an email application that stores its data to an email exchange dataset comprising a plurality of volumes stored on a plurality of storage systems 120. The application will typically not have knowledge or information regarding which storage systems 120 store the volumes of the dataset, and as such, the dataset-start request will typically not specify the storage systems 120 storing the dataset. In some embodiments, receiving the dataset-start request initiates the start phase of the method 500.

The method 500 then determines (at 520) a start time and dataset timeout period for the overall dataset image operation. The start time may comprise the start time for the overall dataset image operation for producing the dataset image of the dataset. For example, the start time may comprise a time (or approximate time) when the method 500 received the dataset-start request from the application. The dataset timeout period may comprise a maximum amount of time that is allowed/permitted for the overall dataset image operation to produce the dataset image before the overall dataset image operation is stopped/aborted. The dataset timeout period may be defined by and start from the start time. Different values may be used for the dataset timeout period depending on different situations. For example, for urgent situations where a dataset image is needed quickly, the dataset timeout period may equal 5 seconds from the start time, for average situations where a dataset image is needed in an average time, the dataset timeout period may equal 7 seconds from the start time, and for relaxed situations where a dataset image is not needed quickly, the dataset timeout period may equal 20 seconds from the start time. In other embodiments, other values for the time period may be used. In other embodiments, the value for the time period may be user specified.

In some embodiments, the dataset timeout period may be enforced by the dataset image manager 350 and/or a volume image manager 250 executing on any storage system 120. The dataset image manager 350 may implement a dataset image timeout method 600 (discussed in relation to FIG. 6) to enforce the dataset timeout period on the plurality of storage systems storing the dataset. If the dataset timeout period expires, the dataset image manager 350 may cause the dataset image method 500 for producing the dataset image to stop/abort, as well as initiate an image cleanup procedure on the plurality of storage systems storing the dataset. In addition, each volume image manager 250 may execute a volume image method 900 (discussed in relation to FIG. 9) for producing volume images of volumes of a dataset and implement a volume image timeout method 1000 (discussed in relation to FIG. 10) to enforce the dataset timeout period on the particular storage system on which the volume image manager 250 executes and resides. If the dataset timeout period expires, the volume image manager 250 may cause the volume image method 900 to stop/abort, as well as initiate an image cleanup procedure on the particular storage system.

The method 500 then identifies (at 525) the plurality of storage systems that store the plurality of volumes that comprise the dataset. For example, the method 500 may determine a plurality of storage system IDs of the plurality of storage systems that store the dataset. As used herein, an "identified storage system" may refer to a storage system that stores one or more volumes of the dataset. Note that the method may receive (at 510) a dataset-start request specifying a plurality of volume IDs of the plurality of volumes that comprise the dataset, but the dataset-start request will typically not specify the storage systems 120 storing the dataset. In some embodiments, the method 500 identifies the plurality of storage systems that store the dataset by using the configuration data structure 700 as a look-up or mapping table. For example, for each volume ID 705 of a volume specified in the dataset-start request, the method 500 may determine a matching entry 701 in the configuration data structure 700 having a matching volume ID 705 and identify the storage system ID 710 in the matching entry 701 as the storage system that stores the volume. In this manner, the method 500 may identify a plurality of storage system IDs of the plurality of storage systems that store the dataset.

The method 500 then produces (at 530) a plurality of groupings (sometimes referred to as buckets) for the plurality of volumes of the dataset. For example, each grouping/bucket may comprise all volumes of the dataset that are stored on a same storage system. In this manner, each grouping may represent a single storage system, the grouping comprising one or more volumes of the dataset that are stored on the single storage system. As such, the method 500 organizes and divides (at 530) the plurality of volumes of the dataset into a plurality of groupings.

The method 500 then produces (at 535) a new operation ID (also referred to as a token ID) for producing the dataset image. The operation ID may represent an overall dataset image operation for producing the entire dataset image for the dataset. The overall dataset image operation may comprise sub-operations for producing the various volume images for the volumes comprising the dataset. The operation ID may comprise a unique identifier that uniquely identifies the overall operation for producing the dataset image among other possible overall operations for producing other dataset images of other datasets. In general, the operation ID may be specified in communications between the application, the dataset image manager 350, and/or the plurality of volume image managers 250 to uniquely identify the overall dataset image operation that the communication pertains to.

The method 500 then produces (at 540) a new dataset-operation data structure (DS) 800 corresponding to and being associated with the new operation ID, and stores various data/information needed for managing and producing the dataset image to the dataset-operation DS 800. For example, the method 500 may store the data/information determined in steps 520 through 535 to the dataset-operation DS 800. Such data may include the operation ID, start time, and dataset timeout period for the overall dataset image operation, the plurality of storage system IDs of the plurality of storage systems that store the dataset, and/or the plurality of groupings. The data/information used for managing and producing the dataset image may be organized and stored in the dataset-operation DS 800 in various manners using any organizational structure.

FIG. 8 shows a conceptual diagram of an exemplary dataset-operation DS 800 in accordance with some embodiments. The dataset-operation DS 800 may comprise a plurality of grouping entries 801 (such as 801a, 801b, etc.) and a header 805. The header 805 may comprise data fields for an operation ID 810, start time 815, and/or dataset timeout period 820. Each grouping entry 801 represents a grouping and a single storage system, the grouping comprising one or more volumes of the dataset that are stored on the single storage system. Each grouping entry 801 for a storage system may comprise a plurality of data fields, such as data fields for a storage system ID 850 (e.g., SSID1) of the storage system, one or more volume IDs 855 (e.g., VID1, VID2, etc.) of one or more volumes of the dataset that are stored on the storage system, and a plurality of indicators/flags (such as volume-start response 860 and volume-commit response 865).

In the exemplary dataset-operation DS 800 of FIG. 8, the dataset comprises a plurality of volumes VID1, VID3, VID4, VID11, VID13, wherein volume VID1 is stored on a first storage system SSID1, volumes VID3 and VID4 are stored on a second storage system SSID2, and volumes VID11 and VID13 are stored on a third storage system SSID3. As such, a first grouping and a first grouping entry 801a is produced to represent the first storage system, the first grouping entry 801a specifying the storage system ID SSID1 850 and the volume ID VID1 855; a second grouping and a second grouping entry 801b is produced to represent the second storage system, the second grouping entry 801b specifying the storage system ID SSID2 850 and the volume IDs VID3 and VID4 855; and a third grouping and a third grouping entry 801c is produced to represent the third storage system, the third grouping entry 801c specifying the storage system ID SSID3 850 and the volume IDs VID11 and VID13 855.

The method 500 then calls/initiates (at 545) the dataset image timeout method 600. The dataset image timeout method 600 may have access to the dataset-operation DS 800 and determine the start time and dataset timeout period. Using the start time and dataset timeout period from the dataset-operation DS 800, the dataset image timeout method 600 may implement/enforce the dataset timeout period on the method 500 for producing the dataset image (as discussed in relation to FIG. 6).

The method 500 then sends (at 550) a volume-start request to the volume image manager 250 of each identified storage system 120 for suspending one or more volumes of the dataset and begin producing volume images of one or more volumes of the dataset. The method 500 may identify which storage systems 120 to send the volume-start request using the dataset-operation DS 800, wherein the method 500 may identify/select each storage system specified in the storage system ID 850 data field. The volume-start request may comprise a volume-start application programming interface (API) call from the dataset image manager 350 to the volume image manager 250 of each identified storage system 120.

The volume-start request sent to an identified storage system 120 may specify all volumes or at least one volume of the dataset (e.g., specify all volume IDs or at least one volume ID of the dataset). In some embodiments, the volume-start request specifies all volumes of the dataset, whereby the volume image manager 250 of each identified storage system 120 determines which particular volumes of the dataset are stored to its particular storage system 120. In other embodiments, the volume-start request sent to an identified storage system 120 may specify only those volumes of the dataset that are stored on the identified storage system 120. In these embodiments, the method 500 may use the dataset-operation DS 800 to produce the volume-start request for each identified storage system 120 to specify only those volumes listed in the volume ID 855 data field. As such, in these embodiments, the method 500 may produce and send (at 550) a plurality of different volume-start requests to a plurality of identified storage systems 120, each volume-start request being customized/adapted to each particular identified storage system 120.

In some embodiments, each volume-start request further specifies the operation ID 810, the start time 815, and the dataset timeout period 820. The operation ID may be used in interactions and communications between the dataset image manager 350 and each volume image manager 250 to uniquely identify the overall dataset image operation. The start time 815 and the dataset timeout period 820 may be used by each volume image manager 250 to individually and separately enforce the dataset timeout period.

In some embodiments, the volume image manager 250 of each storage system 120 maintains a volume-operation data structure (DS) for storing various data/information for managing and producing one or more volume images of one or more volumes of a particular dataset. For example, the volume-operation DS may store the operation ID, the start time, and the dataset timeout period associated with the particular dataset. In addition, the volume-operation DS (DS) may store volume IDs of one or more volumes of the particular dataset that are stored on the storage system 120. In this manner, the operation ID may be used by the volume image manager 250 to identify an overall dataset image operation and its corresponding volume-operation DS storing the various data/information for the overall dataset image operation.

In some embodiments, the dataset image method 500 may perform interactions and operations between the plurality of volume image managers 250 in parallel. In these embodiments, the method 500 may send (at 550) the plurality of volume-start requests to the plurality of identified storage systems 120 simultaneously and in parallel to allow for faster execution of the dataset image method 500.

In some embodiments, the volume-start request sent to an identified storage system 120 comprises a request to suspend and initiate/begin producing volume images of all volumes of the dataset that are stored on the identified storage system 120. When a storage system 120 has successfully completed suspending all volumes of the dataset stored on the storage system 120 and initiated producing the volume images of all volumes of the dataset stored on the storage system 120, the volume image manager 250 on the storage system 120 may send a volume-start response to the dataset image manager 350. The volume-start response may comprise the operation ID of the overall dataset image operation that the response pertains to.

The method 500 then determines (at 555) that a volume-start response has been received from each identified storage system 120 that stores one or more volumes of the dataset. A volume-start response from a storage system 120 indicates that all volumes of the dataset stored on the storage system 120 have been suspended and producing the volume images of the volumes has been initiated (which is different than an indication that the volume images of the volumes have been completed). The method 500 may determine step 555 by using the dataset-operation DS 800 associated with the specified operation ID. For example, when a volume-start response is received from a storage system, the method 500 may indicate such in the grouping entry 801 for the storage system. In the exemplary dataset-operation DS 800 of FIG. 8, a volume-start response 860 data field in each grouping entry 801 indicates whether or not a volume-start response has been received from the storage system. When the method 500 determines that all grouping entries 801 in the dataset-operation DS 800 have a volume-start response 860 data field indicating that a volume-start response has been received, the method 500 may determine (at 555) that a volume-start response has been received from each identified storage system 120, and thus all volumes of the dataset have successfully been suspended.

The method 500 then sends (at 560) a dataset-start response to the application indicating that all volumes of the dataset are suspended and volume images of all volumes of the dataset has been initiated. The dataset-start response may comprise a response to the dataset-start request received (at 515) from the application. The dataset-start response is sometimes referred to as a resume response. The resume response further specifies the operation ID of the overall dataset image operation that the response pertains to. The application will be configured such that, after receiving the dataset-start request, it resumes its other operations (operations not related to I/O operations to the volumes of its dataset) only after it receives the resume response. As such, by dividing the dataset image method 500 into a start phase and a commit phase, the application receives the resume response after the shorter start phase and may quickly resume its other operations. In addition to resuming its other operations, the application will also be configured to send a data-set commit request to the dataset image manager 350 in response to receiving the resume response.

As such, the method 500 then receives (at 565) a dataset-commit request from the application for managing and completing the dataset image. For example, the dataset-commit request may comprise a dataset-commit application programming interface (API) call from the application. The dataset-commit request further specifies the operation ID of the overall dataset image operation that the request pertains to. In some embodiments, receiving the dataset-commit request (at 565) initiates the commit phase of the method 500.

The method 500 then sends (at 570) a volume-commit request to the volume image manager 250 of each identified storage system 120 that stores one or more volumes of the dataset for completing volume images of the one or more volumes and for unsuspending/restarting I/O operations on volumes of the dataset. Each volume image manager, after receiving the volume-commit request, ensures to completing any ongoing volume images and then it unsuspends/restarts the I/O operations immediately. With the volume-commit request, the method 500 also queries each volume image manager if the volume images on the storage system were successful or not. The method 500 may identify which storage systems 120 to send the volume-commit request by using the dataset-operation DS 800 corresponding to the operation ID specified in the received dataset-commit request. Using the corresponding dataset-operation DS 800, the method 500 may identify/select each storage system specified in the storage system ID 850 data field. The volume-commit request may comprise a volume-commit application programming interface (API) call from the dataset image manager 350 to the volume image manager 250 of each identified storage system 120. Each volume-commit request may further specify the operation ID that the request pertains to. Using the operation ID, the volume image manager 250 of each identified storage system 120 may identify the corresponding volume-operation DS and determine the volume IDs of those volumes the volume-commit request pertains to (i.e., the volumes of the dataset that are stored to the storage system 120).

In some embodiments, the dataset image method 500 may perform interactions and operations between the plurality of volume image managers 250 in parallel. In these embodiments, the method 500 may send (at 570) the plurality of volume-commit requests to the plurality of identified storage systems 120 simultaneously and in parallel to allow for faster execution of the dataset image method 500.

In particular, the volume-commit request may comprise a request for each identified storage system 120 to determine and indicate the success or failure of producing volume images of each and all volumes of the dataset that are stored to the storage system 120. When the volume image manager 250 of each identified storage system 120 determines whether producing volume images of volumes of the dataset that are stored to the storage system 120 is a success or failure, the volume image manager 250 sends a volume-commit response to the dataset image manager 350. In some embodiments, a volume-commit response from a storage system 120 that indicates a success status indicates that a volume image has been successfully produced for each and all of one or more volumes of the dataset that are stored to the storage system 120. In some embodiments, a volume-commit response from a storage system 120 that indicates a failure status indicates that a volume image has not been successfully produced for one or more volumes of the dataset that are stored to the storage system 120.

The method 500 determines (at 575) that a volume-commit response has been received from each identified storage system 120 that stores one or more volumes of the dataset. Each volume-commit response may specify the operation ID of the overall dataset image operation that the response pertains to. As each volume-commit response is received from a storage system 120, the method 500 may store the value of the volume-commit response in the grouping entry 801 for the storage system 120 in the dataset-operation DS 800 corresponding to the received operation ID. In the exemplary dataset-operation DS 800 of FIG. 8, a volume-commit response 865 data field in each grouping entry 801 indicates whether a volume-commit response indicates a success or failure status.

Figure 6:
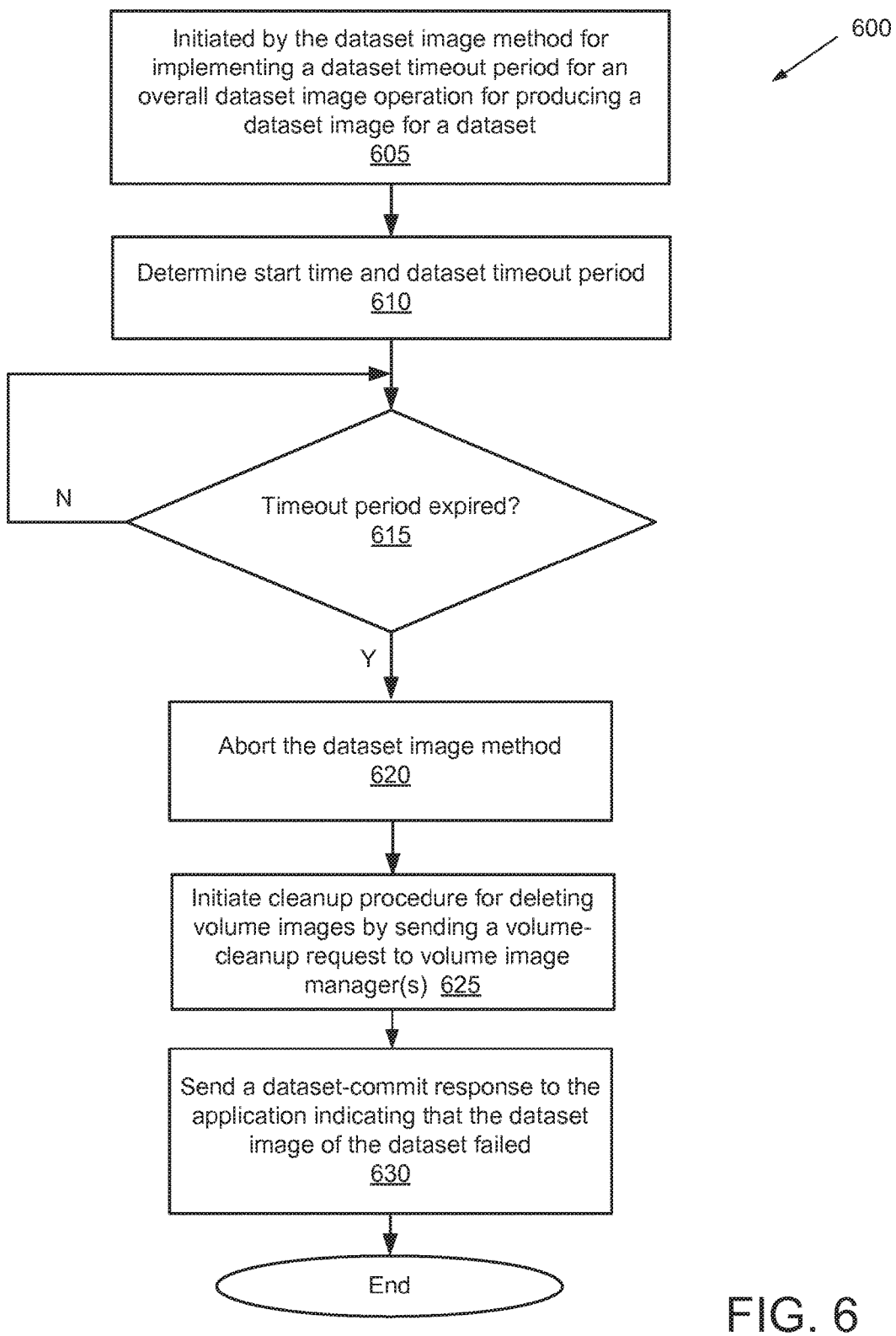
FIG. 6 is a flowchart of dataset image timeout method for monitoring and implementing a dataset timeout period for producing a dataset image of a dataset.

The method 500 aborts/stops (at 577) the dataset image timeout method 600 (described in relation to FIG. 6). As discussed above, the dataset image timeout method 600 is simultaneously executed for monitoring and implementing the dataset timeout period that may cause an abort/stoppage of the dataset image method 500. However, if the method 500 has proceeded to this point, this indicates that the method 500 has determined whether the dataset image is a success or failure before the dataset timeout period expired. As such, the monitoring and enforcing of the dataset timeout period by the dataset image timeout method 600 is no longer needed and can be aborted/stopped.

The method 500 then determines (at 580) whether each and all received volume-commit responses indicate a success status. If so, the method 500 determines (at 585) that the overall dataset image operation is successful and the dataset image of the dataset is successfully produced. As such, the method 500 sends (at 585) a dataset-commit response to the application indicating that the dataset image of the dataset has been successfully produced. The dataset-commit response may comprise a response to the dataset-commit request received (at 565) from the application. The dataset-commit response further specifies the operation ID of the overall dataset image operation that the response pertains to. The method 500 then ends.

If the method 500 determines (at 580-No) that each and all received volume-commit responses do not indicate a success status, the method 500 determines (at 590) that the overall dataset image operation is not successful and the dataset image of the dataset is not successfully produced. In these embodiments, if even a single volume-commit response is received that indicates a failure status, the method 500 determines that the overall dataset image operation is not successful. In this manner, successful production of volume images of each and all volumes of the dataset are needed to determine that the dataset image of the dataset is successfully produced. As such, the method 500 sends (at 590) a dataset-commit response to the application indicating that the dataset image of the dataset has not been successfully produced. The dataset-commit response may comprise a response to the dataset-commit request received (at 565) from the application. The dataset-commit response further specifies the operation ID of the overall dataset image operation that the response pertains to.

If the dataset image is not successfully produced, the method 500 then initiates (at 595) a cleanup/rollback procedure for deleting one or more volume images of one or more volumes of the dataset. In some embodiments, the cleanup procedure may be used for deleting one or more volume images that were successfully produced on an identified storage system. Since the volume images were produced for an unsuccessful data image, the volume images are no longer needed and unnecessarily consumes storage resources. As such, the cleanup procedure provides automated removal of unneeded volume images that were produced for an unsuccessful data image. In some embodiments, failed volume images that were unsuccessfully produced are typically already deleted by the storage system 120, and thus typically do not require later removal by the cleanup procedure. In other embodiments, failed volume images are also deleted by the cleanup procedure.

In some embodiments, the method 500 initiates (at 595) the cleanup procedure by sending a volume-cleanup request to the volume image manager 250 of each identified storage systems 120 that stores one or more volumes of the dataset for removing volume images of the one or more volumes. The method 500 may use the corresponding dataset-operation DS 800 to identify/select each storage system specified in the storage system ID 850 data field. The volume-cleanup request may comprise a volume-cleanup application programming interface (API) call from the dataset image manager 350 to the volume image manager 250 of each identified storage system 120. Each volume-cleanup request may further specify the operation ID that the request pertains to. Using the operation ID, the volume image manager 250 of each identified storage system 120 may identify the corresponding volume-operation DS and determine the volume IDs of those volumes the volume-cleanup request pertains to (i.e., the volumes of the dataset that are stored to the storage system 120). In response, the volume image manager 250 of each identified storage system 120 will delete one or more volume images of the one or more volumes of the dataset that are stored to the storage system 120. The method 500 then ends. Note that steps 515-595 of the method 500 may be repeated for each dataset-start request received from an application.

D. Method for Dataset Image Timeout

FIG. 6 is a flowchart of dataset image timeout method 600 for monitoring and implementing a dataset timeout period for producing a dataset image of a dataset. The dataset image timeout method 600 may execute simultaneously with the dataset image method 500 of FIG. 5 and may cause an abort/stoppage of the dataset image method 600. Steps of method 600 may be performed by various hardware and/or software components residing and executing on a computer system 300 and/or storage system 120 that are configured for performing the method 600. In some embodiments, some or all steps of the method 600 are performed by a dataset image manager 350 residing and executing on a computer system 300 (such as a server system 110 or storage system 120). The order and number of steps of the method 600 are for illustrative purposes only and, in other embodiments, a different order and/or number of steps are used.

The method 600 begins when it is initiated (at 605) by the dataset image method 500 for monitoring and implementing a dataset timeout period for an overall dataset image operation for producing a dataset image for a dataset (see step 545 of FIG. 5).

The method 600 then determines (at 610) a start time and dataset timeout period for completing the overall dataset image operation. In some embodiments, the method 600 may access the dataset-operation DS 800 corresponding to the overall dataset image operation and determine the start time 815 and dataset timeout period 820. The start time may comprise an operation start time for producing the dataset image of the dataset. The dataset timeout period may comprise a maximum amount of time that is allowed/permitted for producing the dataset image of the dataset. The dataset timeout period may be defined by and start from the start time.

The method 600 then determines (at 615) whether the dataset timeout period has expired. The method 600 may do so by determining whether there is no more remaining time in the dataset timeout period. In some embodiments, the method 600 may do so by using the following equation: remaining time=dataset timeout period−(current time−start time). In these embodiments, if the method 600 determines (at 615) that the remaining time is equal to zero, the method 600 determines that the dataset timeout period has expired. If the method 600 determines that the dataset timeout period has not expired, the method 600 continues at step 615 to continually monitor the remaining time.

If the method 600 determines (at 615-Yes) the dataset timeout period has expired, the method 600 then aborts/stops (at 620) the dataset image method 500 of FIG. 5. Since the dataset timeout period has expired, the dataset image method 500 no longer needs to be executed and may be stopped.

The method 600 then initiates (at 625) a cleanup/rollback procedure for deleting one or more volume images of one or more volumes of the dataset. The cleanup procedure may be similar to the cleanup procedure of step 595 of the dataset image method 500 and is not discussed in detail here. In some embodiments, the cleanup procedure may be used for deleting one or more volume images that were successfully produced on an identified storage system. The method 600 may initiate (at 625) the cleanup procedure by sending a volume-cleanup request to the volume image manager 250 of each identified storage systems 120 that stores one or more volumes of the dataset for removing volume images of the one or more volumes. The method 600 may use the corresponding dataset-operation DS 800 to identify/select each storage system specified in the storage system ID 850 data field. In response, the volume image manager 250 of each identified storage system 120 will delete one or more volume images of the one or more volumes of the dataset that are stored to the storage system 120.

The method 600 then sends (at 630) a dataset-commit response to the application indicating that the dataset image of the dataset has not been successfully produced. The dataset-commit response may comprise a response to the dataset-commit request received from the application. The dataset-commit response further specifies the operation ID of the overall dataset image operation that the response pertains to. The method 600 then ends.

IV. Volume Image Manager for Managing and Producing Volume Images

A. Method for Managing and Producing a Volume Image

Figure 9A:
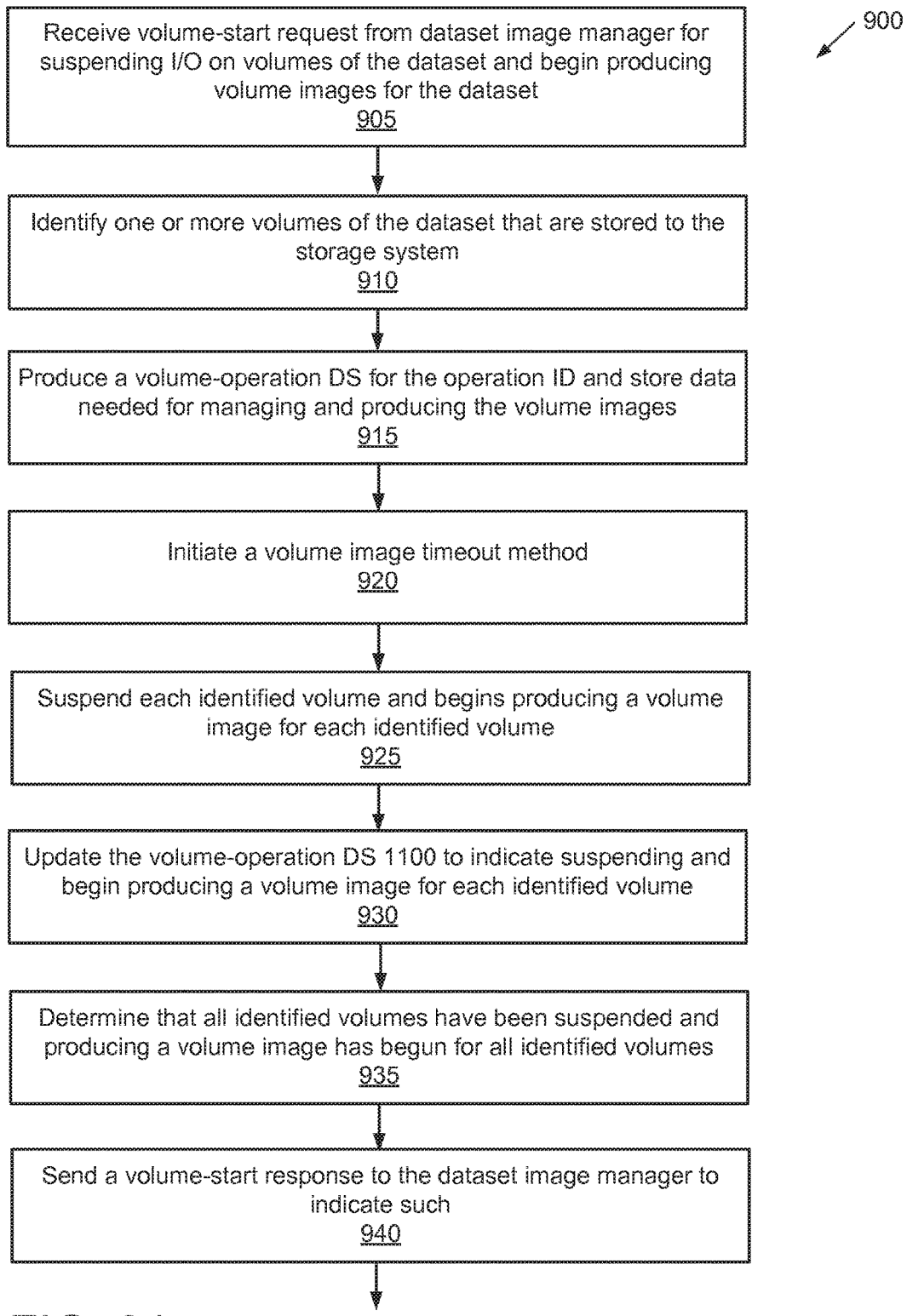
FIGS. 9A-B are a flowchart of volume image method for managing and producing one or more volume images of one or more volumes of a dataset.
Figure 9B:
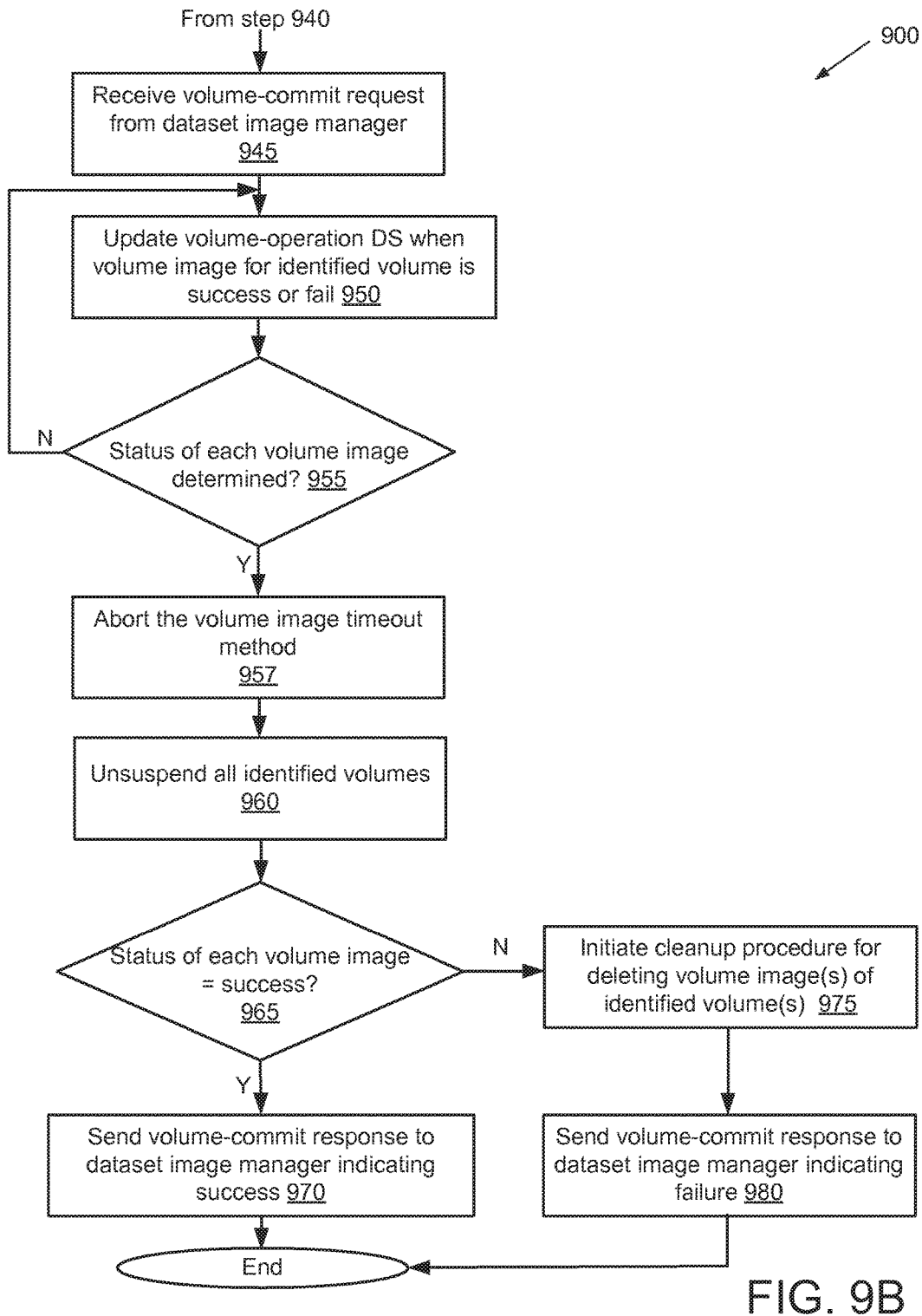

FIGS. 9A-B is a flowchart of volume image method 900 for managing and producing one or more volume images of one or more volumes of a dataset. In some embodiments, the dataset comprises a plurality of storage objects (e.g., volumes) stored on a plurality of different storage systems 120. Steps of method 900 may be performed by various hardware and/or software components residing and executing on a storage system 120 that are configured for performing the method 900. In some embodiments, some or all steps of the method 900 are performed by a volume image manager 250 residing and executing on a storage system 120 that stores one or more volumes of the dataset. The volume image manager 250 may operate in conjunction with the storage operating system 230 of the storage system 120 to perform some steps of the method 900. The method 900 may use various communication messages sent between the various components described herein, such as between an application, a dataset image manager, and/or a volume image manager. Communication messages may be sent between such components, for example, through a network, data bus, or the like. The order and number of steps of the method 900 are for illustrative purposes only and, in other embodiments, a different order and/or number of steps are used.

The method 900 begins when it receives (at 905) a volume-start request from the dataset image manager 350 (see step 550 of FIG. 5). In some embodiments, receiving the volume-start request initiates the start phase of the method 900. The volume-start request may comprise a request for suspending one or more volumes of the dataset and begin producing volume images of one or more volumes of the dataset that are stored to the storage system 120. The volume-start request may specify all volumes or at least one volume of the dataset (e.g., specify all volume IDs or at least one volume ID of the dataset). In some embodiments, the volume-start request further specifies an operation ID, a start time, and a dataset timeout period. The operation ID may uniquely identify an overall dataset image operation for producing a dataset image of the dataset. The start time may comprise the start time for the overall dataset image operation for producing the dataset image of the dataset. The dataset timeout period may comprise a maximum amount of time that is allowed/permitted for the overall dataset image operation to produce the dataset image. The start time and the dataset timeout period may be used by a volume image timeout method 1000 (described in relation to FIG. 10) to enforce the dataset timeout period.

The method 900 then identifies (at 910) one or more volumes (e.g., identifies one or more volume IDs) of the dataset that are stored to the storage system 120, the one or more identified volumes being the volumes that the volume-start request pertains to. As used herein, an "identified volume" may refer to a volume of the dataset that is stored to the storage system 120 on which the method 900 executes. In some embodiments, the volume-start request specifies all volumes of the dataset, whereby the method 900 identifies (at 910) which particular volumes of the dataset are stored to its storage system 120. In other embodiments, the volume-start request specifies only those volumes of the dataset that are stored on the storage system 120. In these embodiments, the method 900 identifies (at 910) all the volumes specified in the volume-start request.

The method 900 then produces (at 915) a new volume-operation data structure (DS) 1100 for the operation ID and stores various data/information needed for managing and producing the volume images to the volume-operation DS 1100. Such data may include the operation ID, start time, and dataset timeout period for the overall dataset image operation, and volume IDs of the one or more identified volumes. In this manner, the operation ID may be used by the method 900 to identify an overall dataset image operation and its corresponding volume-operation DS storing the various data/information for producing volume images for the overall dataset image operation. As such, only the operation ID may be needed in communications between the volume image manager 250 and the dataset image manager 350, without needing to continually include other data/information (such as start time, dataset timeout period, and/or volume IDs). The data/information used for managing and producing the volume images may be organized and stored in the volume-operation DS 1100 in various manners using any organizational structure.

Figure 11:
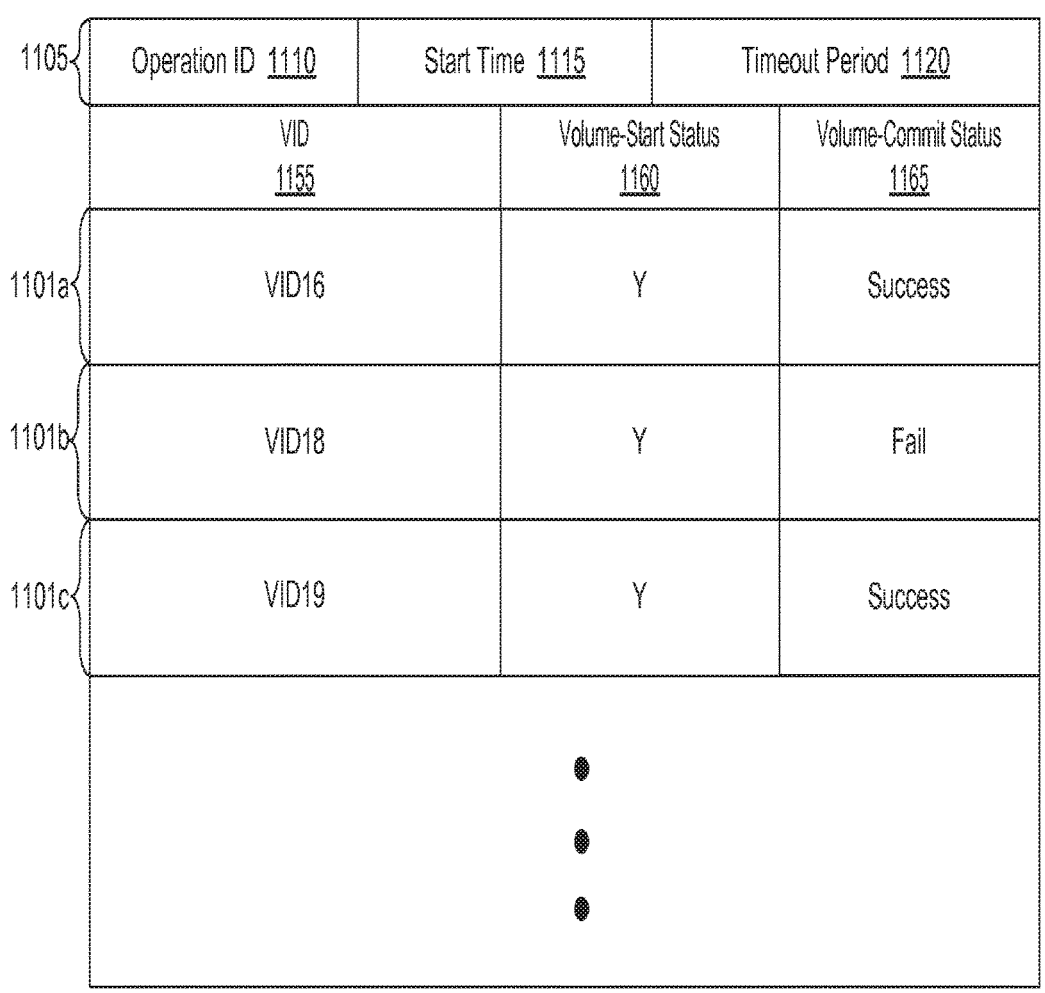
FIG. 11 shows a conceptual diagram of an exemplary volume-operation data structure in accordance with some embodiments.

FIG. 11 shows a conceptual diagram of an exemplary volume-operation DS 1100 in accordance with some embodiments. The volume-operation DS 1100 may comprise one or more volume entries 1101 (such as 1101a, 1101b, etc.) and a header 1105. The header 1105 may comprise data fields for an operation ID 1110, start time 1115, and/or dataset timeout period 1120. Each volume entry 1101 represents an identified volume of the dataset that is stored on the storage system 120. A volume entry 1101 representing an identified volume may comprise a plurality of data fields, such as data fields for a volume ID 1155 (e.g., VID16) of the identified volume, and a plurality of status indicators (such as volume-start status 1160 and volume-commit status 1165). In the exemplary volume-operation DS 1100 of FIG. 11, the identified volumes of the dataset that are stored on the storage system 120 comprise volumes VID16, VID18, and VID19, each identified volume being represented by an entry 1101 in the volume-operation DS 1100.

The method 900 then calls/initiates (at 920) the volume image timeout method 1000. The volume image timeout method 1000 may have access to the volume-operation DS 1100 and determine the start time and dataset timeout period. Using the start time and dataset timeout period from the volume-operation DS 1100, the volume image timeout method 1000 may implement/enforce the dataset timeout period on the method 900 for producing the one or more volume images (as discussed in relation to FIG. 10).

The method 900 suspends (at 925) each identified volume of the dataset and begins producing a volume image for each identified volume of the dataset. The method 900 may suspend an identified volume by operating in conjunction with the storage operating system 230 to stop all input/output (I/O) operations for the volume, which stops accesses (e.g., read or write requests) for the volume. As such, no more write requests with be performed on the identified volumes after the volumes are suspended so as to prepare the volumes for imaging. After suspending the identified volumes, the method 900 initiates procedures for producing a volume image for each identified volume. An image may comprise a persistent point in time (PPT) view or image of data of a storage object, such as a volume. An image may provide a read-only copy of a storage object that protects against accidental deletions or modifications of data of the storage object. As such, an image may comprise a persistent image of the exact state of the data of the storage object at a given point in time. An image may comprise a data backup of the storage object that may be used, for example, to restore/recover the data of the storage object after data has been corrupted, lost, or altered. In some embodiments, the method 900 initiates (at 925) procedures for using Snapshot™ technology (provided by NetApp, Inc.) for producing a volume image for each identified volume. In other embodiments, the method 900 initiates (at 925) procedures using other technologies for producing a volume image for each identified volume.

As each identified volume is suspended and a volume image has been initiated, the method 900 updates (at 930) the volume-operation DS 1100 to indicate such. The method 900 may do so by locating the volume entry 1101 for each identified volume and updating the data field for the volume-start status 1160 to indicate that the volume is suspended and producing a volume image has begun. The method 900 then determines (at 935) that all identified volumes have been suspended and producing a volume image has begun for all identified volumes. The method 900 may do so by determining that the volume-start status 1160 for the volume entry 1101 for each and all identified volumes indicates that the volume is suspended and a volume image has begun.

When the method 900 has successfully completed suspending all volumes of the dataset stored on the storage system 120 and initiated producing the volume images of all volumes of the dataset stored on the storage system 120, the method 900 sends (at 940) a volume-start response to the dataset image manager 350 to indicate such. The volume-start response may comprise the operation ID of the overall dataset image operation that the response pertains to.

The method 900 then receives (at 945) a volume-commit request from the dataset image manager 350 (see step 570 of FIG. 5). In some embodiments, receiving the volume-commit request initiates the commit phase of the method 900. The volume-commit request may comprise a request for completing volume images of one or more identified volumes of the dataset that are stored to the storage system 120.

In particular, the volume-commit request may comprise a request for each identified storage system 120 to determine and indicate the success or failure of producing a volume image for each and all identified volumes of the dataset that are stored to the storage system 120. Each volume-commit request may further specify the operation ID that the request pertains to. Using the operation ID, the method 900 may identify the corresponding volume-operation DS 1100 and determine the volume IDs of those volumes the volume-commit request pertains to (i.e., the volumes of the dataset that are stored to the storage system 120).

When a volume image for an identified volume is successfully produced or fails, the method 900 updates (at 950) the volume-operation DS 1100 to indicate such. The method 900 may do so by locating the volume entry 1101 for the identified volume and updating the data field for the volume-commit status 1165 to indicate whether the volume image for the volume is a success or a failure.

The method 900 then determines (at 955) whether a commit status for the volume image for each and all identified volumes has been determined yet (i.e., determined as either a success or a failure). The method 900 may do so by locating the volume entries 1101 for each and all identified volumes and determining whether each and all volume-commit status data fields 1165 indicate a success or a failure. If the status for volume images of each and all identified volumes has not been determined yet (at 955-No), the method 900 continues at step 950.

Figure 10:
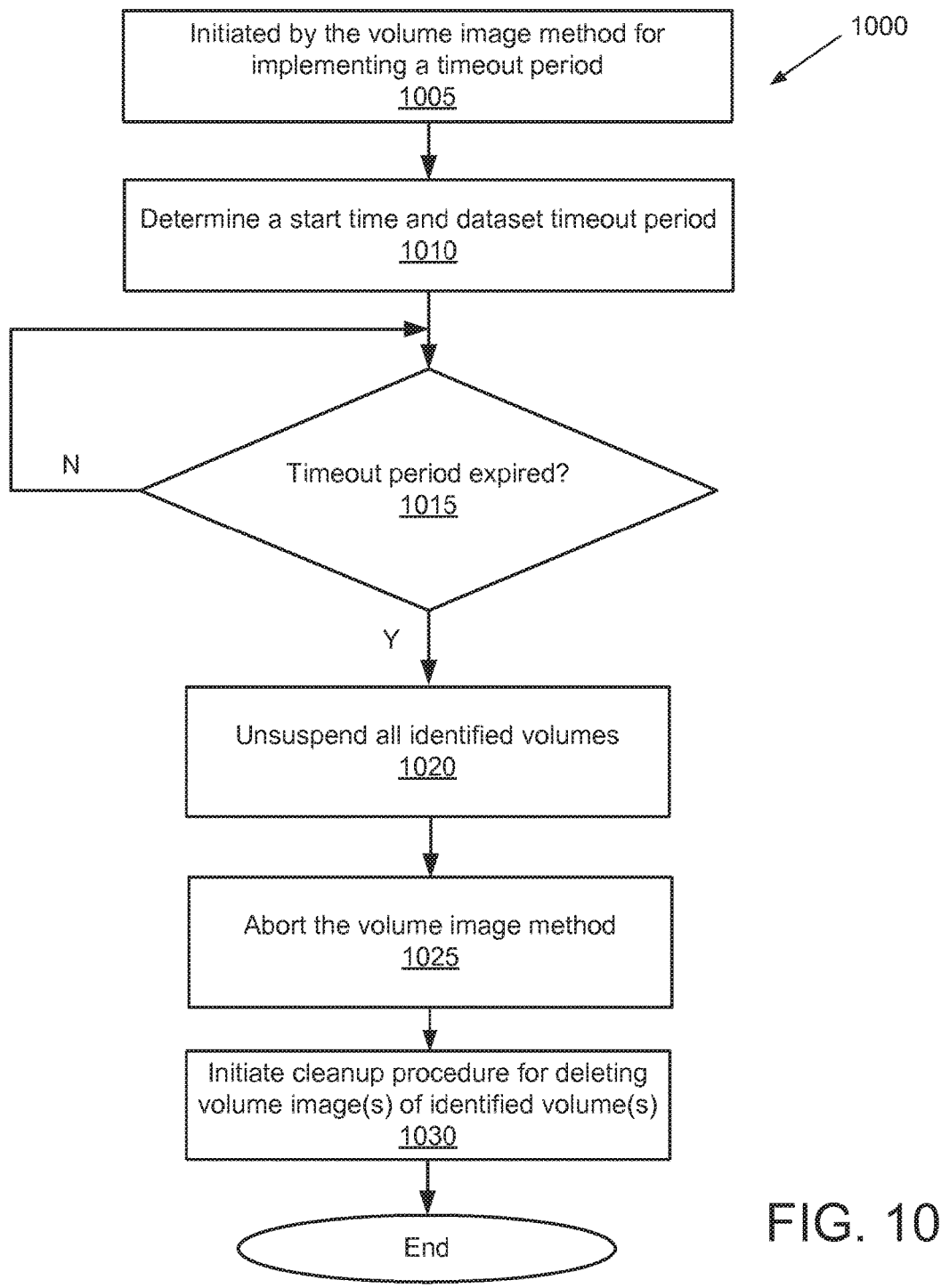
FIG. 10 is a flowchart of volume image timeout method for monitoring and implementing a dataset timeout period for producing one or more volume images of one or more volumes of a dataset.

If the status for volume images of each and all identified volumes has been determined (at 955-Yes), the method 900 aborts/stops (at 957) the volume image timeout method 1000 (described in relation to FIG. 10). As discussed above, the volume image timeout method 1000 is simultaneously executed for monitoring and implementing the dataset timeout period that may cause an abort/stoppage of the volume image method 900. However, if the method 900 has proceeded to this point and reached step 957, this indicates that the method 900 has completed before the dataset timeout period expired. As such, the monitoring and enforcing of the dataset timeout period by the volume image timeout method 1000 is no longer needed and can be aborted/stopped.

The method 900 then unsuspends (at 960) all the identified volumes. The method 900 may do so by operating in conjunction with the storage operating system 230 to resume input/output (I/O) operations for all identified volumes, which allows accesses (e.g., read or write requests) for all identified volumes. Since a volume image has succeeded or failed on each identified volume, the identified volumes no longer need to be suspended to produce volume images. Note that in other embodiments, the method 900 may unsuspend (at 960) all identified volumes if any volume image fails, whereby the method 900 may unsuspend all identified volumes without waiting for the status for volume images of all identified volumes.

The method 900 then determines (at 965) whether the commit status for the volume image for each and all identified volumes is a success. The method 900 may do so by locating the volume entries 1101 for each and all identified volumes and determining whether each and all volume-commit status data fields 1165 indicate a success. If so, the method 900 sends (at 970) a volume-commit response to the dataset image manager 350 indicating a success status. In some embodiments, a volume-commit response from a storage system 120 that indicates a success status indicates that a volume image has been successfully produced for each and all of one or more volumes of the dataset that are stored to the storage system 120. The volume-commit response may also specify the operation ID of the overall dataset image operation that the response pertains to. The method 900 then ends.

If the method 900 determines (at 965-No) that the commit status for the volume image for each and all identified volumes is not a success, the method 900 then initiates (at 975) a cleanup/rollback procedure for deleting one or more volume images of one or more identified volumes. In some embodiments, the cleanup procedure may be used for deleting one or more volume images that were successfully produced on the storage system. As such, the cleanup procedure provides automated removal of unneeded volume images that were successfully produced. In some embodiments, failed volume images that were unsuccessfully produced are typically already deleted by the storage system 120, and thus typically do not require later removal by the cleanup procedure. In other embodiments, failed volume images are also deleted by the cleanup procedure. The method 900 may do so by operating in conjunction with the storage operating system 230 to delete the volume images of all identified volumes, the volume images being successful or failed.

The method 900 sends (at 980) a volume-commit response to the dataset image manager 350 indicating a failure status. In some embodiments, a volume-commit response from a storage system 120 that indicates a failure status indicates that a volume image has not been successfully produced for one or more volumes of the dataset that are stored to the storage system 120. The volume-commit response may also specify the operation ID of the overall dataset image operation that the response pertains to. In these embodiments, if even a single volume image fails, producing the volume images of all the identified volumes is considered failed, even for any successfully produced volume images. The method 900 then ends.

B. Method for Volume Image Timeout

As discussed above, the dataset timeout period may be enforced by the dataset image manager 350 and/or any volume image manager 250 executing on any storage system 120. Each volume image manager 250 may execute a volume image method 900 for producing volume images of volumes of a dataset and implement a volume image timeout method 1000 to enforce the dataset timeout period on the particular storage system on which the volume image manager 250 executes and resides. If the dataset timeout period expires, the volume image manager 250 may cause the volume image method 900 to stop/abort, as well as initiate an image cleanup procedure on the particular storage system.

FIG. 10 is a flowchart of volume image timeout method 1000 for monitoring and implementing a dataset timeout period for producing one or more volume images of one or more volumes of a dataset. The volume image timeout method 1000 may execute simultaneously with the volume image method 900 of FIG. 9 and may cause an abort/stoppage of the volume image method 1000. Steps of method 1000 may be performed by various hardware and/or software components residing and executing on a storage system 120 that are configured for performing the method 1000. In some embodiments, some or all steps of the method 1000 are performed by a volume image manager 250 residing and executing on a storage system 120 that stores one or more volumes of the dataset. The volume image manager 250 may operate in conjunction with the storage operating system 230 of the storage system 120 to perform some steps of the method 1000. The order and number of steps of the method 1000 are for illustrative purposes only and, in other embodiments, a different order and/or number of steps are used.

The method 1000 begins when it is initiated (at 1005) by the volume image method 900 for monitoring and implementing a timeout period for producing one or more volume images of an overall dataset image operation for producing a dataset image of a dataset (see step 920 of FIG. 9). The method 1000 then determines (at 1010) a start time and a dataset timeout period. In some embodiments, the method 1000 may access the volume-operation DS 1100 corresponding to the overall dataset image operation and determine the start time 1115 and dataset timeout period 1120. The start time may comprise an operation start time for producing the dataset image of the dataset. The dataset timeout period may comprise a maximum amount of time that is allowed/permitted for producing the dataset image of the dataset.

The method 1000 then determines (at 1015) whether a timeout period (dataset timeout period or volume timeout period) has expired. The method 1000 may do so by determining whether there is no more remaining time in the dataset timeout period. If the method 1000 determines (at 1015) that the remaining time is equal to zero, the method 1000 determines that the timeout period (dataset or volume timeout period) has expired.

In some embodiments, the method 1000 may do so by using the following equation: remaining time=dataset timeout period−(current time−start time). In other embodiments, the volume image manager 250 of each storage system 120 determines and uses a different timeout period (referred to as a volume timeout period) than the dataset timeout period. The volume timeout period may comprise the dataset timeout period minus a predetermined time amount that accounts for the time needed to send the volume-commit response to the dataset image manager 350. As such, the volume timeout period may be shorter in time that the dataset timeout period to account for the time needed to send the volume-commit response to the dataset image manager 350. In these embodiments, the method 1000 may determine (at 1015) whether the timeout period has expired by determining whether there is no more remaining time in the volume timeout period by using the following equation: remaining time=volume timeout period−(current time−start time), wherein volume timeout period=dataset timeout period−predetermined time amount.

In some embodiments, the predetermined time amount may be based on various factors, such as the performance capabilities of the storage system 120 that executes the volume image manager 250, physical/geographical distance between the storage system 120 that executes the volume image manager 250 and the computer system that executes the dataset image manager 350, etc. As such, the predetermined time amount may be different for different volume image managers 250 and storage systems 120. For example, a first volume image manager executing on a first storage system may have a first predetermined time amount and a first volume timeout period, and a second volume image manager executing on a second storage system may have a second predetermined time amount and a second volume timeout period, the first and second predetermined time amounts being different, and the first and second volume timeout periods being different.

If the method 1000 determines (at 1015-No) that the timeout period has not expired, the method 1000 continues at step 1015 to continually monitor the remaining time. If the method 1000 determines (at 1015-Yes) the timeout period has expired, the method 1000 then unsuspends (at 1020) all the identified volumes. The method 1000 may do so by operating in conjunction with the storage operating system 230 to resume input/output (I/O) operations for all identified volumes, which allows accesses (e.g., read or write requests) for all identified volumes. The method 1000 then aborts/ stops (at 1025) the volume image method 900 of FIG. 9. Since the timeout period has expired, the volume image method 900 no longer needs to be executed and may be stopped.

The method 1000 then initiates (at 1030) a cleanup/ rollback procedure for deleting one or more volume images of one or more identified volumes that are stored to the storage system 120. The cleanup procedure may be similar to the cleanup procedure of step 975 of the volume image method 900 and is not discussed in detail here. In some embodiments, the cleanup procedure may be used for deleting one or more volume images that were successfully produced on the storage system. The method 1000 may do so by operating in conjunction with the storage operating system 230 to delete the volume images of all identified volumes, the volume images being successful or failed. The method 1000 then ends.

C. Method for Cleanup

As discussed above, the dataset image method 500 (at step 595) and/or the dataset image timeout method 600 (at step 625) may initiate a cleanup/rollback procedure if the dataset image is not successfully produced within a dataset timeout period. The cleanup procedure may be initiated on a plurality of storage systems 120 for deleting volume images of volumes of the dataset that are stored across the plurality of storage systems 120. For example, the cleanup procedure may be initiated by sending a volume-cleanup request to the volume image manager 250 of each storage system 120 that stores one or more volumes of the dataset.

Figure 12:
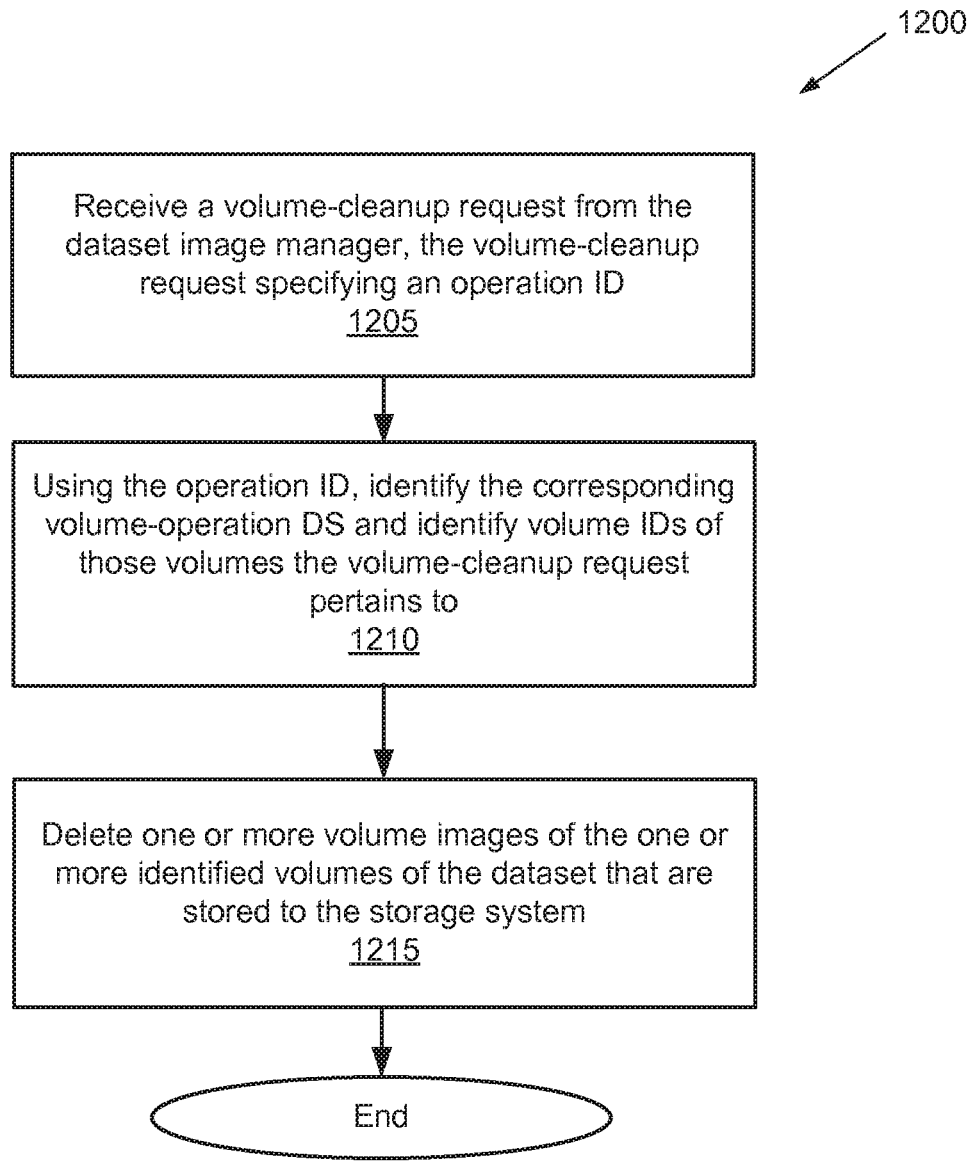
FIG. 12 is a flowchart of cleanup method for deleting one or more volume images of one or more volumes of the dataset stored on a storage system.

FIG. 12 is a flowchart of cleanup method 1200 for deleting one or more volume images of one or more volumes of the dataset stored on a storage system 120. Steps of method 1200 may be performed by various hardware and/or software components residing and executing on a storage system 120 that are configured for performing the method 1200. In some embodiments, some or all steps of the method 1200 are performed by a volume image manager 250 residing and executing on a storage system 120 that stores one or more volumes of the dataset. The volume image manager 250 may operate in conjunction with the storage operating system 230 of the storage system 120 to perform some steps of the method 1200. The order and number of steps of the method 1200 are for illustrative purposes only and, in other embodiments, a different order and/or number of steps are used.

The method 1200 begins when it receives (at 1205) a volume-cleanup request from the dataset image manager 350. The volume-cleanup request may specify the operation ID that the request pertains to. Using the operation ID, the method 1200 then identifies (at 1210) the corresponding volume-operation DS 1100 and identifies the volume IDs of those volumes the volume-cleanup request pertains to (i.e., the volumes of the dataset that are stored to the storage system 120).

The method 1200 then deletes (at 1215) one or more volume images of the one or more identified volumes of the dataset that are stored to the storage system 120. In some embodiments, the method 1200 may delete one or more volume images that were successfully produced on the storage system. In other embodiments, failed volume images that were unsuccessfully produced are typically already deleted by the storage system 120, and thus typically do not require later removal by the method 1200. In other embodiments, failed volume images are also deleted by the method 1200. The method 1200 may do so by operating in conjunction with the storage operating system 230 to delete the volume images of all identified volumes, the volume images being successful or failed. The method 1200 then ends.

As such, even after a volume image manager 250 successfully executes the volume image method 900 for producing volume images of all identified volumes stored on the storage system within the timeout period, in some situations, the method 1200 may still delete the successful volume images produced on the storage system. This may occur, for example, if the timeout period expired before volume images of volumes of the dataset on another storage system were successfully produced and/or volume images of volumes of the dataset on another storage system had failed, thus causing the dataset image method 500 (at step 595) and/or the dataset image timeout method 600 (at step 625) to initiate the cleanup/rollback procedure on all the identified storage systems. This, in turn, may cause an identified storage system 120 that successfully produced all volume images of all identified volumes within the timeout period, to delete all the successful volume images due to the failure of another identified storage system.

VARIOUS EMBODIMENTS

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/ warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, applications, modules, algorithms, techniques, processes, or method steps of embodiments described herein may be implemented as computer electronic hardware, computer software, or combinations of both. To illustrate this interchangeability of hardware and software, various illustrative components, blocks, applications, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, applications, modules, and circuits described in connection with the embodiments disclosed herein may be implemented or performed with a general-purpose processor, a digital signal processor (DSP), an application-specific integrated circuit (ASIC), a graphics processing unit (GPU), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The applications, modules, algorithm, techniques, processes, or methods described in connection with embodiments disclosed herein may be embodied directly in computer hardware configured to perform the embodiments disclosed herein, in software executed by a processor, or in a combination of the two. In some embodiments, any software application, program, tool, module, or layer described herein may comprise an engine comprising hardware, software, or a combination of the two configured to perform embodiments described herein. In general, functions of a software application, program, tool, module, or layer described herein may be embodied directly in hardware, or embodied as software executed by a processor, or embodied as a combination of the two.

A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A computing device, comprising:
   a memory comprising machine executable code for performing a method; and
   a processor coupled to the memory, the processor configured to execute the machine executable code to perform the method comprising:
      receiving a start request for producing a dataset image of a dataset maintained across a plurality of storage systems, wherein a first storage object of the data set is maintained by a first storage system and a second storage object of the data set is maintained by a second storage system;
      sending a first volume-commit request to the first storage system to create a first storage object image of the first storage object and a second volume-commit request to the second storage system to create a second storage object image of the second storage object; and
      determining that production of the dataset image is a success based upon volume-commit responses from the first storage system and the second storage system indicating that the first storage object image and the second storage object image were created.

2. The computing device of claim 1, wherein the machine executable code causes the processor to perform the method comprising:
   monitoring a timeout period comprising a maximum amount of time permitted for producing the dataset image.

3. The computing device of claim 2, wherein the machine executable code causes the processor to perform the method comprising:
   initiating a cleanup procedure for deleting one or more storage object images based upon the timeout period expiring.

4. The computing device of claim 1, wherein the machine executable code causes the processor to perform the method comprising:
   producing an operation identifier (ID) for the dataset image.

5. The computing device of claim 1, wherein the start request is received from an application that is configured for resuming operations after receiving a resume response sent to the application based upon receipt of the start request.

6. The computing device of claim 4, wherein the operation ID represents an overall dataset image operation for producing the dataset image for the dataset.

7. The computing device of claim 1, wherein the machine executable code causes the processor to perform the method comprising:

performing operations with multiple storage systems in parallel for producing the dataset image.

8. A non-transitory computer readable medium having instructions stored thereon, the non-transitory computer readable medium comprising instructions for:
receiving a start request for producing a dataset image of a dataset maintained across a plurality of storage systems, wherein a first storage object of the data set is maintained by a first storage system and a second storage object of the data set is maintained by a second storage system;
sending a first volume-commit request to the first storage system to create a first storage object image of the first storage object and a second volume-commit request to the second storage system to create a second storage object image of the second storage object; and
determining that production of the dataset image is a success based upon volume-commit responses from the first storage system and the second storage system indicating that the first storage object image and the second storage object image were created.

9. The non-transitory computer readable medium of claim 8, wherein the instructions further provide for:
monitoring a timeout period comprising a maximum amount of time permitted for producing the dataset image.

10. The non-transitory computer readable medium of claim 8, wherein the instructions further provide for:
initiating a cleanup procedure for deleting one or more storage object images.

11. The non-transitory computer readable medium of claim 8, wherein the instructions further provide for producing an operation identifier (ID) for the dataset image.

12. The non-transitory computer readable medium of claim 8, wherein the start request is received from an application that is configured for resuming operations after receiving a resume response sent to the application based upon receipt of the start request.

13. The non-transitory computer readable medium of claim 11, wherein the operation ID represents an overall dataset image operation for producing the dataset image for the dataset.

14. The non-transitory computer readable medium of claim 8, wherein the instructions further provide for:
performing operations with multiple storage systems in parallel for producing the dataset image.

15. A method, comprising:
receiving a start request for producing a dataset image of a dataset maintained across a plurality of storage systems, wherein a first storage object of the data set is maintained by a first storage system and a second storage object of the data set is maintained by a second storage system;
sending a first volume-commit request to the first storage system to create a first storage object image of the first storage object and a second volume-commit request to the second storage system to create a second storage object image of the second storage object; and
determining that production of the dataset image is a success based upon volume-commit responses from the first storage system and the second storage system indicating that the first storage object image and the second storage object image were created.

16. The method of claim 15, further comprising:
monitoring a timeout period comprising a maximum amount of time permitted for producing the dataset image.

17. The method of claim 16, comprising:
initiating a cleanup procedure for deleting one or more storage object images based upon the timeout period expiring.

18. The method of claim 15, further comprising producing an operation identifier (ID) for the dataset image.

19. The method of claim 15, wherein the start request is received from an application that is configured for resuming operations after receiving a resume response sent to the application based upon receipt of the start request.

20. The method of claim 18, wherein the operation ID representing an overall dataset image operation for producing the dataset image for the dataset.

* * * * *